(12) United States Patent
Cheng

(10) Patent No.: US 6,329,986 B1
(45) Date of Patent: *Dec. 11, 2001

(54) PRIORITY-BASED VIRTUAL ENVIRONMENT

(75) Inventor: Doreen Yining Cheng, Los Altos, CA (US)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,459

(22) Filed: Feb. 21, 1998

(51) Int. Cl.[7] .................................................. G06T 15/00
(52) U.S. Cl. ........................................... 345/419; 345/706
(58) Field of Search ..................... 345/419, 706

(56) References Cited

U.S. PATENT DOCUMENTS 5,736,982 * 4/1998 Suzuki et al. ..................... 345/330
5,956,039 * 9/1999 Woods et al. ..................... 345/419

* cited by examiner

Primary Examiner—Jeffery Brier
Assistant Examiner—Motilewa Good-Johnson
(74) Attorney, Agent, or Firm—Harold Tsiang

(57) ABSTRACT

A system enabling priority-based operation of a virtual environment, the system having a priority component that provides priorities for avatars and non-avatar objects, such that highest priority avatars/objects have (a) enhanced rendering and (b) increased quality of service from networks and operating systems. The priority component is responsive to selected parameters, including, for example, one or more of (i) objects' relative positions, (ii) the direction, orientation and span of sense and focus spaces, (iii) participants' profiles, (iv) predetermined parameters as set by developers and/or participants, (v) social parameters, (vi) economic models and (vii) combinations of these and other selected parameters. In some embodiments, the system employs only the attention component.

17 Claims, 6 Drawing Sheets

PRIORITY-BASED VIRTUAL ENVIRONMENT

RELATED APPLICATION

U.S. Patent Application of Doreen Y. Cheng, Ser. No. 09/027,461, filed concurrently herewith and entitled ATTENTION-BASED INTERACTION IN A VIRTUAL ENVIRONMENT, is herein incorporated by reference.

BACKGROUND OF THE INVENTION

This invention relates to a system, apparatus and method for enabling rendering in a virtual environment and, particularly, a system, apparatus and method for enabling priority-based rendering in a virtual environment.

The high-volume, consumer electronics market segment is progressing toward the integration of computer-based advances and traditional audio/video products. Among the computer-based advances, networking systems (e.g., the Internet) offer new opportunities in diverse fields, including entertainment, education, information search, and social interaction. Traditional audio and video offers ease of use and consumer comfort and acceptance in the home, particularly the family room.

One approach to this integration would rely on virtual environments. Virtual environments comprise computer-generated, generally three-dimensional representations of a real, physical setting or scene. The setting/scene can be a city, a mall, an individual store, a building, a suite of offices, an individual office or some other space. The representations can be more or less realistic both in terms of their rendering of the real world and in terms of the human senses that are supported.

In any case, a virtual environment generally comprises virtual objects, the objects typically including entities that are animate or inanimate. Inanimate entities may include features of the environment, such as, for example, walls of a virtual office that are always inanimate walls in the office. Animate entities may include so-called avatars and bots. Bots, broadly, are images that, generally, operate autonomously from the participants, performing predetermined tasks or providing features within the environment. A bot can include, for example, a wall that transforms to deliver incoming messages. An avatar, by comparison, generally is an image that represents, and is controlled by, a participant. An avatar, typically supports one or more of body gestures, facial expressions, speech and motion.

However configured, a virtual environment generally beckons its participants to become immersed in the sensory experience it provides. To do so, the participants interact with the environment's objects. The quality of the participant's experience depends, broadly, on the quality of interaction supported by the environment. In that regard, studies of existing virtual environments have indicated that the quality of social interaction between participants is a dominant factor in determining whether participants are stimulated to repeatedly visit a virtual environment. The studies have also shown that the quality of social interactions depends on support, in avatars, of facial expressions, as well as other body language, generally associated with face-to-face encounters in the real world.

Notwithstanding the studies' findings, however, current virtual environments either fail to support or inadequately support social interaction between participants. To improve the quality of social interaction supported, several challenges are to be met. One such challenge is enabling control of resource loading and allocation, particularly without undermining the immersive and other qualities of the application. Particularly with communication and rendering of multimedia data, conventional virtual environments tend to overload and/or inadequately allocate resources. Such overloading and mis-allocation, in turn, generally impedes support of social interaction via multimedia, e.g. via speech, music, environmental sound, facial and gesture animation, and/or video.

Accordingly, a need exists, in the context of virtual environments, for a system that overcomes the shortcomings of conventional virtual environment technologies, particularly as to rendering and data communication.

SUMMARY OF THE INVENTION

An object of this invention is to provide a virtual environment that overcomes the shortcomings associated with rendering and data communication.

According to one aspect of the invention, a system is provided that comprises a priority component. The priority component determines priorities for avatars and objects, such that highest priority avatars/objects have (a) enhanced rendering (e.g., enhancement of resolution, frame rate, colors and/or other qualities) as to the senses and dimensions supported by the system and (b) enhanced quality of service from networks and operating systems. The priority component preferably is responsive to selected parameters, including, for example, one or more of (i) objects' relative positions, (ii) the direction, orientation and span of sense and focus spaces, (iii) participants' profiles, (iv) parameters set by developers and/or participants, (v) social parameters, (vi) economic features, e.g., cost structures and (vii) combinations of these and other selected parameters.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

BRIEF DESCRIPTION OF THE DRAWINGS

The drawings, all according to the present invention, include.

DETAILED DESCRIPTION

Terminology

Virtual environment system, as used herein, refers to any individual or plural, central or distributed, computing-based system capable of supporting a virtual world or other virtual environment, or settings/scenes thereof, particularly any such environment characterized by avatars, bots and other virtual objects.

Virtual object (or, sometimes, object alone) is any thing or part of the virtual environment, whether animate, inanimate or combinations thereof. Inanimate virtual objects may include features of the environment, e.g., inanimate walls in a virtual office. Animate virtual objects may include avatars and bots.

Avatar, as used herein, refers to a virtual object that represents, and is controlled by, a participant. An avatar typically supports, e.g., one or more of body gestures, facial expressions, speech and motion. An avatar, while so representing and supporting, can be other than anthropomorphic and can comprise a combination of both animate and inanimate virtual objects.

Non-avatar object, as used herein, refers to a virtual object that does not represent a participant. Typically, non-avatar objects can operate autonomously from the participants, supporting predetermined senses (e.g., analogous to avatar sight), having predetermined functions (e.g., provide information), performing predetermined tasks (e.g., collect information) or providing features (e.g., image of a tree) of the environment. It is to be recognized that a non-avatar object can be a component of an avatar. As an example, a non-avatar object can include a wall that, in interaction with an avatar, either remains a wall or animates to deliver message directed to the interacting avatar. As another example, a non-avatar object can include an appendage or other part of a first avatar that, when triggered by a second avatar, provides to the second avatar selected information, such as personal information of the participant associated with the first avatar.

Overview

Figure 1A:
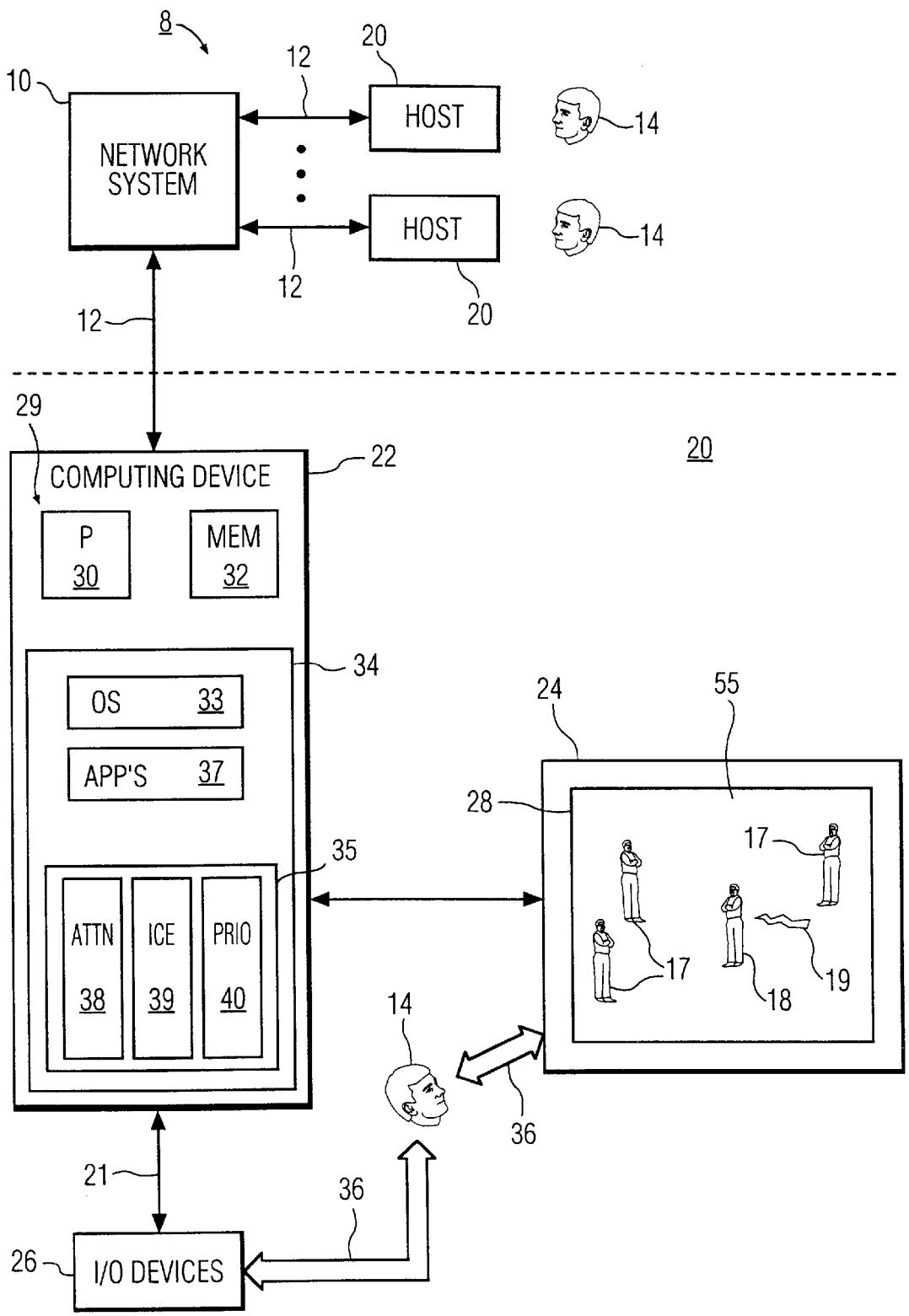
FIG. 1a showing a block diagram of a virtual environment system, including a priority component, according to the principles of the invention.

As shown in FIG. 1a, a virtual environment system 8, as contemplated by this invention, comprises a network system 10 to and/or through which are coupled, via communication channels 12, one or more hosts 20. Each of the hosts 20 has associated therewith a participant 14 who interacts with the virtual environment via the respective station 20.

The network system 10 comprises a selected topology. An example topology of the system 10 includes a star network having a centralized computing system to which all the hosts 20 are connected. This example topology provides: (i) the centralized computing system runs server software that administers the virtual environment (e.g., receiving from and transmitting to participants 14 data concerning interaction, motion and other selected features and behaviors of virtual objects); (ii) the hosts 20 run client software that controls the local virtual experience, including obtaining and transmitting data to the server respecting its participant's interaction with and in the environment ("interaction data") and multimedia data (such as images, sound, and or text) responsive to received data; and (iii) the server software controls the distribution of data, including interaction data received from each host 20, among all hosts 20. It is understood that the centralized computing system can comprise a host 20.

Another example topology employs direct connections among hosts 20, wherein (i) typical connections rely on protocols such as transmission control protocol (TCP) and/or user datagram protocol (UDP), (ii) server/client software is essentially distributed among each of the hosts 20 and (iii) each host's software sends its participant's interaction data to relevant other hosts 20. Yet another example topology employs direct connections wherein, rather than communicating interaction data among all participants one by one, a participant communicates their data to a selected group address (i.e., multicasting) such that each host 20 of a particular group address can choose whether to accept/reject the data. It is to be recognized that other topologies can be employed without departing from the principles of the invention, including, for example topologies that combine one or more features of the above topologies.

A host 20 according to the present invention, comprises a computing device 22 coupled, via connections 21, to each of one or more display devices 24 and one or more input/output (I/O) devices 26. The connections 21 typically comprise wire/cabling, but, in the case of one or more of the I/O devices 26 and display devices 24, the connections can be implemented using a wireless technology (e.g., infrared technology).

Other than by observing the virtual environment 16 (see FIG. 1b) through the display device 24, the participant 14 interacts with the environment 16 through interaction connections 36. The interaction connections 36 provide a human-machine-type link between the participant and the I/O devices 26 and/or the display device 24.

Although the system 8, as depicted, provides a third person view of the environment, it is to be recognized that the system 8 can provide either/both third and first person views, without departing from the principles of the invention. That is, system preferably is implemented so that the virtual environment is presented to its participant either in first person or third person view: (i) first person view provides for experiencing and interacting in the virtual environment effectively as if the participant is the avatar (e.g., as if the participant sees the environment effectively through the avatar's eyes) and (ii) third person view provides for experiencing and interacting in the virtual environment separate from the avatar (e.g., as if seeing the environment through a camera mounted at a view point effectively above the avatar and, in that regard, enabled to observe the avatar in the environment). It is also preferred, however, that the participant is enabled to experience and interact with the virtual environment, at any point in time, through only one view (the "control view").

Each display device 24 has a screen 28, the screen imaging the environment 16, particularly setting/scenes thereof. In one embodiment, as shown, the screen 28 images the participant's avatar 18, other avatars 17 and a non-avatar object 19 (e.g., a lightning bolt seeking to shock the avatar 18). Although the system 8 provides a third person view of the environment, it is to be recognized that the system 8 can provide either/both third and first person views, without departing from the principles of the invention.

A preferred display device 24 comprises a head-mounted display (HMD) equipped with spatial disposition technology (i.e., to detect head and/or eye motions relative to, e.g., the displayed virtual environment 16 ). However, it is to be understood that other types of display devices 24 can be used without departing from the principles of the invention (e.g., a single or an array of monitors).

The I/O devices 26 preferably include one or more data acquisition devices that provide data representative of the participant's interaction with and in the virtual environment. In that regard, the I/O devices 26 preferably are responsive to the movements of the participant's body parts or sense-based socialization. It is to be recognized that the devices can include one or more of a keyboard, a microphone, audio speakers, olfactory generators/detectors, pointing devices (e.g., a mouse, trackball, touch pad, and/or a joystick), steering devices (e.g., steering wheel or bar, bicycle frame, virtual skis and/or skates), movement sensors, facial gesture detecting devices, virtual reality gloves, haptic suits and/or other haptic attire, as well as other data acquisition devices, alone or in combination, without departing from the principles of the invention.

The computing device 22 typically includes a general purpose computer 29 having a processor 30, a memory system 32 (e.g., volatile memory and/or nonvolatile mass memory) and supporting software 34. The software 34 preferably includes an operating system ("OS") 33, a virtual environment package 35 (e.g., either client, client/host or other software associated with the topology of the environment), and some number of other application programs 37. The OS 33 preferably supports multimedia, e.g., through a graphical user interface (GUI). The OS 33 typically comprises a collection of component programs. The OS component programs generally include (i) device drivers associated with the respective I/O devices 26 and (ii) display device drivers associated with the display devices 24.

It is to be understood that the invention admits a broad range of OS architectures. In that regard, no particular commercial OS, or architectural characteristics thereof, are preferred for implementing this invention. Moreover, it is to be recognized that any implemented OS can be other than as described above, without departing from the principles of the invention. As an example, the OS 33 can omit, combine or re-arrange various of the device drivers, with or without adding new components.

Although the system 8 is depicted to have plural hosts 20, each comprising a computing device, and each implemented in association with but separate from the network system 10, it is to be recognized that other implementations can be used without departing from the principles of the invention. As an example, in one embodiment, the system 8 comprises a single host 20 used by one or more participants via one or more display devices 24, wherein the host 20 provides the network system 10.

Figure 1B:
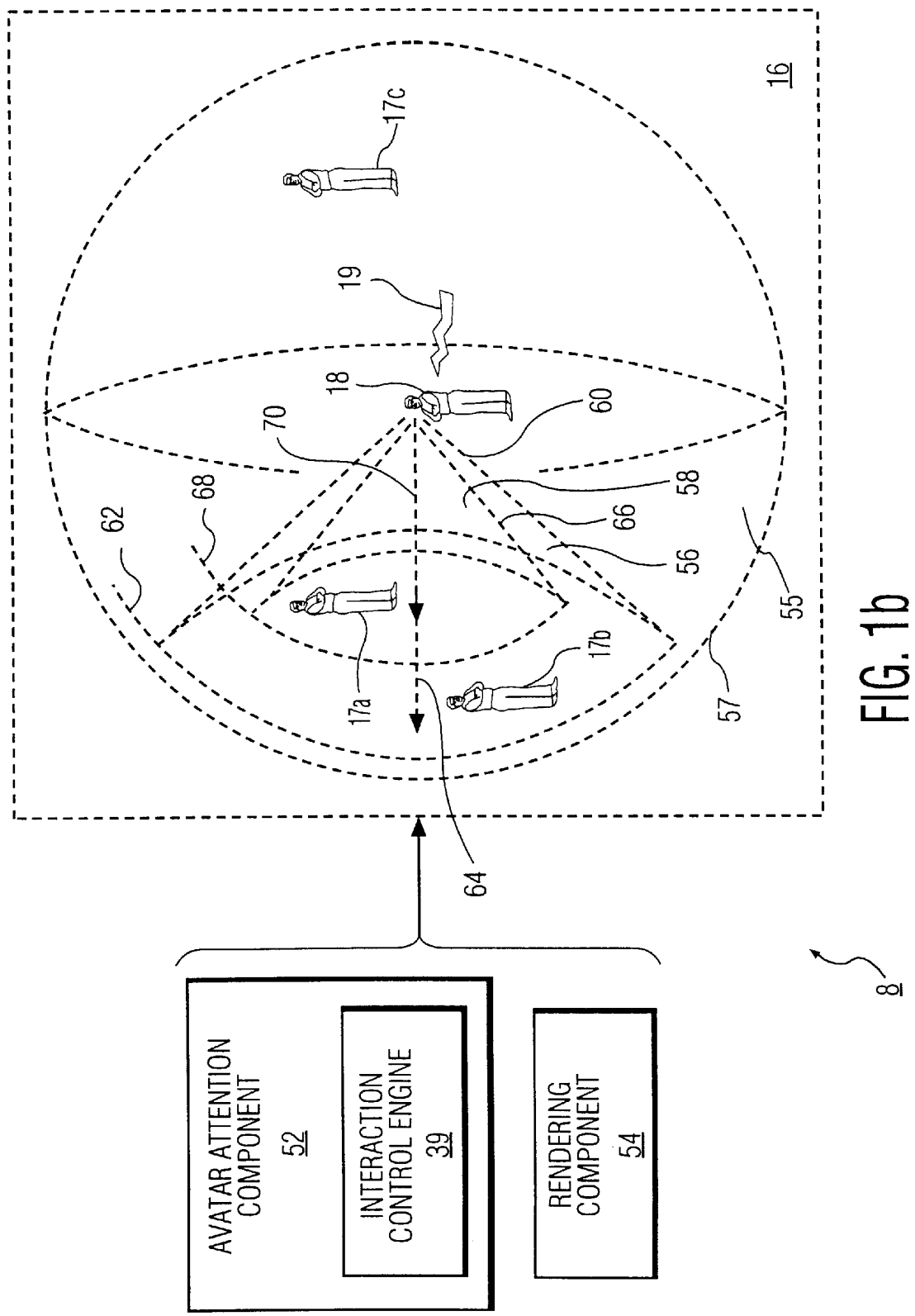
FIG. 1b showing a block diagram of a virtual environment system, showing attention sense and focus spaces of a attention component, according to the principles of the invention.

A virtual environment system 8, as illustrated in FIG. 1b, comprises an avatar attention component 52 and a priority component 54. In one embodiment: (a) the avatar attention component 52 comprises an attention module 38 and an interaction control engine 39, both of the virtual environment package 35, together with associated hardware (whether disposed in one or more hosts 20 and/or the network system 10) and software (e.g., the implicated portions of the OS 33, other applications 37, and any other software of one or more hosts 20 and/or the network system 10) and (b) the priority component 54 comprises an priority module 40 of the virtual environment package 35, together with associated hardware (whether disposed in one or more hosts 20 and/or the network system 10) and software (e.g., the implicated portions of the OS 33, other applications 37, and any other software of one or more hosts 20 and/or the network system 10). In other embodiments, however, either or both of the attention component 52 and the priority component 54 can be implemented in the absence of one or more of respective modules 38, 39, 40 and/or other software.

The avatar attention component 52 employs one or more attention spaces 55, each such space 55 comprising a sense space 56 and a focus space 58. The sense space 56 preferably comprises a sense volume (e.g., a sense sphere 62) and a sense volume section (e.g., a sense cone 60). As illustrated, the sense cone 60 is contained by the sense sphere 62 and has a sense vector 64. The focus space 58 preferably comprises a focus volume (e.g., a focus sphere 68) and a focus volume section (e.g., a focus cone 66). As illustrated, the focus cone 66 is contained by the focus sphere 68 and has a focus vector 70. Preferably, the focus cone 66 is also contained by the sense cone 60. (Sense and focus spheres are sometimes referred to herein individually or collectively as "attention spheres"; sense and focus cones are sometimes referred to herein individually or collectively as "attention cones"; and sense and focus vectors are sometimes referred to herein individually or collectively as "attention vectors".)

The attention component 52 is associated with one or more senses and, as described in greater detail below, its elements and parameters preferably are employed in the operation of the priority component 54. In that regard, as to a particular sense, the attention component provides an attention space. That space's sense space 56 preferably is used to control the objects that the participant/avatar is enabled to perceive (e.g., perception being via rendering and control via priorities). In turn, that space's focus space 58 preferably not only is used to determine the prospective partners (e.g., avatars and/or other virtual objects) with which the participant's avatar is enabled to interact spontaneously, but also preferably is used in computing priorities.

In FIG. 1b, avatars 17a–c are all within the attention space 55 of avatar 18, but (i) only avatars 17a and 17b are in the attention sense space 56 of avatar 18 and (ii) only avatar 17a is also in the attention focus space 58 of avatar 18. (As described further hereinafter, the two spaces preferably contribute to priority-based rendering of avatars and other virtual objects.)

Attention Component

The discussion that follows describes the attention component 52 in additional detail, as respects the sense of sight. This detail, among other things, provides background to the later description of the priority component 54. It is to be recognized that senses other than sight generally are supported by the system, such support being similar to the details that follow for sight. (Throughout the remainder of this document, vector; generally are represented by underscored labels; and participants, avatars and objects generally are represented by italicized capital letters.)

Figure 2:
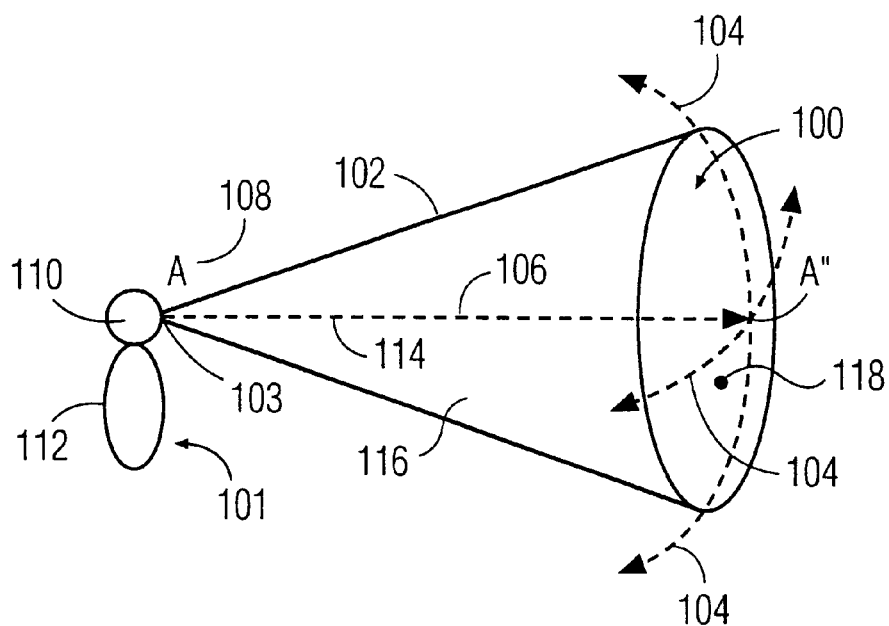
FIG. 2 showing a sense space.
Figure 3:
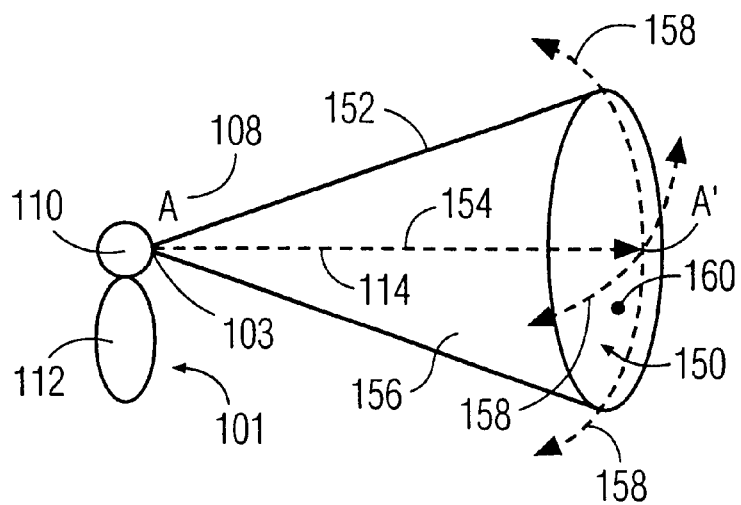
FIG. 3 showing a focus space.

As illustrated in FIGS. 2 and 3, in the context of sight, the attention component's attention space 55 has (i) a sense space 56 comprising a scanning space 100 and (ii) a focus space 58 comprising a gazing space 150. Referring to FIG. 2, the scanning space 100 comprises a vision cone 102 having a vision vector 106.

The vertex "A" 108 of the cone 102 is associated with a selected immersion point 103. In third person view, the immersion point 103 typically is separate from the avatar 101, e.g., a view point. In the case of an avatar 101 in first person view, as shown, the immersion point 103 preferably is a part of the avatar 101. As an example, for sight in first person view, the immersion point 103 preferably is disposed at the center of the avatar's face 110. However, the immersion point 103 can be disposed at the top third of the avatar's face 110 (e.g., the "eyes") or in association with the avatar's body 112. It is to be recognized that these examples rely on the avatar having a face, eyes and/or a body, whereas in any particular implementation, the avatar may be absent one or more of these features.

It also is to be recognized that, in any particular implementation, the attention vectors preferably are associated with the selected immersion point 103. Moreover, the attention vectors preferably are oriented at the immersion point 103. In first person view, because the immersion point 103 is associated with some portion of the avatar 101, the attention vectors are also associated with that avatar portion and preferably are oriented substantially perpendicular to a surface of that portion.

The vision vector (AA") 106 is co-linear with the longitudinal axis 114 of the cone 102 and has a length described by the value |AA"|. The vector 106 resides in the three dimensional space of a vision sphere 104. In first person view, the avatar 101 preferably is disposed at the center of the vision sphere 104. In third person view, the participant preferably is effectively so disposed. As described further below, the vector's direction describes the center of effective attention and its length limits the distance within which attention can be directed.

Referring to FIG. 3, the gazing space 150 comprises a gaze cone 152 having a gaze vector 154. In any one view (e.g., first or third person), the gaze cone 152 preferably shares the vertex (A) 108 and immersion point 103 of the associated vision cone 102.

The gaze vector (AA') 154 comprises the longitudinal axis 114 and has a length described by the value |A'|. The vector 154 preferably is co-linear with the vision vector 106, directed along axis 114. However, it is understood that other orientations of vector 154 can be selected without departing from the principles of the invention. Typically, the length of the gaze vector 154 is less than or equal to the length of the vision vector 106 (i.e., |AA'|<=|AA"|) and the internal angle of the gaze cone 152 preferably is smaller than or equal to the internal angle of the vision cone 102. The gaze vector's direction describes the center of focus and its length limits the distance within which attention can be focused.

The scanning and gazing spaces 100, 150 preferably are bounded. The gazing space 150 preferably is bounded by two surfaces: (i) the surface 156 of the gaze cone 152 and (ii) the surface 160 of a gaze sphere 158. Similarly, the scanning space 100 preferably is bounded by two surfaces: (i) the surface 116 of the vision cone 102 and (ii) the surface 118 of the vision sphere 104. The center of the gaze and vision spheres 158, 104 is the immersion point 103 associated with the vertex 108 (e.g., A) of the respective cones 152, 102. The radius of the gaze sphere 158 is the length of the gaze vector 154 (e.g., |AA'|); the radius of the vision sphere 104 is the length of the vision vector 106 (e.g., |A"|). Bounding in first person view is illustrated in FIG. 3 for the gazing space 150 and in FIG. 2 for the scanning space 100. Similar bounding applies to the spaces in third person view.

Because the length of the gaze vector 154 typically is less than or equal to the length of the vision vector 106, the gazing space 150 typically is contained by the scanning space 100. Moreover, because the spaces 100 and 150 preferably are bounded in part by respective spheres 104, 158, the spaces 100 and 150 preferably comprise conical sections of the respective spheres 104, 158. In addition, these spheres preferably comprise the bounding volumes in that the associated attention cones are thereby able to be enlarged within the respective spheres (i.e., by increasing a cone's internal angle of rotation) so as to, at an extreme and in the absence of any orientation change within the volume, encompass substantially all or entirely all of the sphere.

While the system 8 enables perception of vision signals associated with virtual objects located in the vision sphere 104, the bounding of the scanning space 100 typically establishes effective limitations to such perception (e.g., as described below, rendering typically is limited to a predetermined space). In turn, the bounding of the gazing space 150 establishes effective limitations as to the focus in gazing. As to sight in first person view, for example, the vision sphere's surface 118 typically defines the avatar-based maximum perception limits, while the vision cone's surface 116 defines the avatar-based effective perception limits. In turn, the gaze cone's boundaries effectively limit the avatar-based visual focus as to the other avatars and other virtual objects. In accordance with the invention, the system controls rendering of objects disposed in the vision sphere 104 based on computed priorities, the priority computations preferably being based on disposition of the object relative t, the above described elements of a selected attention space.

The use and bounding of attention spaces, spheres, cones, vectors and the like preferably is selectably applicable in first person view, third person view, or both. If both such views are implemented, it is preferred that they be independently configurable. As an example, first person view can be implemented to have associated therewith each of attention spaces, spheres, cones, vectors, vertex, and immersion point while, for third person view, having associated a combination of some or all of these elements.

As another example, in third person view, the participant preferably is not constrained by the configuration of first person view: the third person immersion point typically is separate from the participant's avatar and the relevant scanning space preferably is a different, selectable portion of the virtual environment. Moreover, elements of the third person spaces (e.g., spheres, cones, etc) preferably have selected dimensional and spatial relationships with correlative elements of first person spaces. In that regard, it is understood, among other relationships, that (i) the third person vision sphere can be larger, smaller or equal in size to the first person vision sphere, (ii) a supported third person vision cone can include some, all or none of the first person vision cone and (iii) supported attention cones of third person view may contain some, all or none of the participant's avatar. In one specific case, supported third person spaces are implemented so that rendering enables the participant to perceive not only what they would perceive if in first person view, but also a selected portion of the virtual environment supplemental thereto.

If both first and third person views are implemented, it is preferred that, when one view is selected, the attention spaces thereof control attention and priority computation (the "control view"). In such case, the attention spaces of the other view are off or defeated. However, it is to be understood that the views can be otherwise implemented, without departing from the principles of the invention.

Disposition In The Virtual Environment

Dispositions in the virtual environment of avatars, objects, immersion points and the like can be determined in various ways. As an example, the disposition of an avatar can generally be determined by the disposition of the vertex of an avatar's first person focus cone, as each such vertex typically is associated with a immersion point at the avatar (e.g., face or eyes). As such, an avatar is within a participant's first or third person gaze cone when a selected focus cone vertex of the avatar is within the participant's first or third person gaze cone. As another example, however, the disposition of an avatar, and particularly non-avatar objects, can be determined independently of any associated cone and/or vertex. To illustrate, where an avatar comprises one or more objects, the dispositions of these objects can be determined relative to the first person immersion point of the avatar. As yet another example, the dispositions of these and other objects, as well as the avatar, can be determined based on one or more markers placed in the virtual environment or based on some other mechanism, all without departing from the principles of the invention. Such disposition, as is described below, preferably is employed in determining priorities under this invention.

Explicit Controls

Based on the configuration of the system 8, explicit controls can be relevant to either/both interaction and priorities. As to priorities, certain explicit controls preferably are supported, these controls implicating participants, avatars (e.g., typically based on a participant's affirmative action) and non-avatar objects (e.g., based on programming). It is understood that explicit controls can be used in first and third person views.

The system 8 preferably supports the following explicit controls respecting priorities:

Show-Profile: a control to display the profile of selected objects. In the case of an avatar, the content of a profile preferably includes, among other information, the respective participant's likes, dislikes, hobbies, and personalities. This control can be variously implemented, including via a key stroke —'p'—with a pointing device (e.g. a mouse) positioned on the object.

Set-Profile: a control to enable change in the content of an object's profile. A profile can be configured so that different versions or portions thereof can be provided and/or rendered accessible. As an example, if a profile is to be provided to a non-avatar object, the provided profile can be selected by the object's type. As another example, if a profile is to be provided to an avatar, the provided profile can be selected by the avatar's associated participant, or by groups and/or categories of participants. To illustrate the latter example, participants appearing in a friend list associated with the profile can be enabled to receive a more-detailed version than participants that are not so listed. Moreover, participants appearing in a pest list may be restricted entirely from receiving or otherwise accessing a profile. This control can be variously implemented, including by providing forms for displaying and changing profiles.

Set-Priority: a control to set parameters for computing priorities. Whether in first or third person view, a participant preferably can selectively change priorities for objects encountered in the virtual environment. Examples of such objects are avatars (including the participant's avatar, specifically the visible parts thereof) and non-avatar objects (including parts of an avatar). To illustrate, this control enables the participant to raise the priority of the audio signal of a friend's avatar so that the participant can hear the friend's audio signal clearly whenever the friend enters the virtual environment. To further illustrate, this control enables the participant to lower the priority of a non-partner object that is broadcasting unwelcome messages. Preferably, the participant is also enabled, through this control, to configure the system for resolving conflicts associated with multiple objects contending for the participant's attention. This control can be variously implemented, including by providing forms and sliders.

Priority Component

As depicted in FIG. 1, the system 8 comprises a priority component 54. The priority component 54, generally stated, provides, separately to each participant, priorities for objects within the participant's attention space or spaces. The priorities preferably are used to determine not only which objects to render, but also the rendering detail. The priorities preferably are also used to determine which objects should be sent over the network and at which level of quality. Via priorities, then, system resources can generally be used with enhanced efficiently. In any case, advantages of the priority-based rendering and data communication arrangement include, as examples, one or more of enhanced coordination of the priority and attention components, reduced complexity of and overall system loading (e.g., relating to rendering computations and communications), and enhanced allocation of system resources in supporting a virtual environment.

The priorities preferably are used to provide rendering/communication in enhanced detail and/or quality for those objects that the participant (or developer) deems important. For example, an object with which a participant is engaged in an interaction session preferably has a high priority and, as such, may be rendered so that, as to one or more selected senses, the participant experiences enhanced manifestations of the object's features. In an exemplary sight-based attention space, the details typically include the object's features, expressions, gestures and other manifestations; as such, the enhancements are directed to one or more of resolution (e.g., numbers of polygons), enhanced animation, and increased frame rates. In an exemplary hearing-based attention space, the details typically include the object's voice(s), each such voice typically being speech, music or other articulation subject to being heard, alone or in combination, by the participant; as such, the enhancement is directed to one or more of volume, resolution, increased bandwidth, and reduced masking from other sounds (e.g., so that the voices are louder, clearer or otherwise distinguished from the voice's of other non-interacting objects).

Priority preferably is determined in connection with selected parameters. Exemplary parameters include one or more of (i) the position of an object relative to one or more of a participant's selected attention spaces, (ii) the direction, orientation and span of the selected sense and focus spaces, (iii) the participants' profiles, (iv) parameters explicitly set by a developer or participant for priority computation, (v) models of social interaction/cultural norms, and (vi) economic features, e.g., cost structures.

Of the selected parameters, one or more parameters preferably serve as base parameters, while the other parameters serve as modifying parameters. In such case, the priorities are first computed using the base parameters. The priorities are subject to modification based on computations using one or more of the modifying parameters. In the illustrative discussions that follow, the context is first person view and two base parameters are described: (a) one base parameter respects the relative distance between (i) the participant's avatar A and (ii) another object B resident in the attention space associated with avatar A and (b) another base parameter respects the angle between (i) the vector AB associated with the relative positions of objects A and B and (ii) an attention vector associated with A. Although these base parameters are preferred in this first person context, it is to be recognized that other base parameters can be selected, without departing from the principles of the invention.

It is also to be recognized that the context can be other than first person view, without departing from the principles of the invention. In the context of in third person view, for example, (a) one base parameter can be selected to be the relative distance between (i) the immersion point of participant A and (ii) another object B resident in the attention space associated with A and (b) another base parameter can be selected to be the angle between (i) the vector AB associated with the relative positions of object B and the immersion point of A and (ii) an attention vector associated with A.

Priority-based rendering and data communication contemplates the employ of plural attention spaces, each such space being associated with a particular sense (e.g., sight, hearing or smell) as described above respecting the attention component. Rendering and communication, in such case, is enabled to have separate priority structures for each sense. As an example, while sight preferably has associated priority structures respecting the base parameters of a vision space, hearing preferably has associated priority structures respecting base parameters of a hearing space, wherein the base parameters of the hearing space can be the same or different than those of the vision space. Priority-based rendering and data communication also contemplates concurrent support of plural senses, each such sense having associated therewith one or more attention spaces.

In one embodiment, objects in a virtual environment comprise source objects and media objects. Source objects include any object with which a participant can interact, e.g. avatars, dogs, and TV sets. Media objects include any object directed to a participants'senses when rendered, e.g. animation, video, sound, text, and graphics. In such embodiment, more than one media object typically is associated with each source object. Generally, then, in a virtual environment comprising source and media objects, participants perceive each source object through its associated media objects.

As described further below, priorities preferably are initially assigned to source objects (e.g., base priorities) in a relevant attention space. In turn, each source object's media objects preferably take priorities according to the respective source object's priority. Accordingly, the media objects of a particular type and associated with a single source object preferably have a priority equivalent to the priority of the source object. As an example, priorities of certain graphics, video and image media objects are associated with a source object and the source object is a single avatar, such that the media objects'priorities are equal to the priority of the avatar. As another example, if priorities of sound stream media objects are computed as to a selected hearing space and if the media objects'source object is a single avatar, the base priorities of the media objects preferably are equal to the base priority of the avatar as to the selected hearing space.

The priorities may be given to media objects in various implementations. For example, the implementations include express assignment (e.g., the system stores each media object together with its priority) and implied assignment (e.g., the system relates the media objects to a priority by relating the media objects to a source object having the priority).

1. Priority Computation Using Base Parameters

With the base parameters selected based on distance and angle as described above, the computation of priorities for each resident object B comprises (i) dividing A's relevant attention space 55 (see FIG. 1b) into regions and (ii) assigning a number to resident objects B based on the region in which each such object resides. The assignment preferably follows selected conditions, including: (a) a region disposed relatively closer to A (e.g., closer to the vertex of A's attention cones) is assigned a higher priority than a region farther away and (b) a region disposed relatively closer to A's attention vectors (e.g., vision vector AA") is assigned a higher priority than a region farther away. As an example, the disposition of a resident object B relative to A is measured by the distance |AB|, while its disposition relative to AA" is measured by angle $\beta$ (angle BAA"). (It is understood that the above-referenced term "relatively closer" generally reflects the virtual environment's configuration as to a "closeness" characteristic.)

So as to provide regions, the applicable attention space (or a selected portion thereof) is divided along two dimensions: (i) a radial dimension (R-dimension) related to the one or more radii of concentric spheres within the attention space and (ii) an angular dimension ($\beta$-dimension) related to an angle $\beta$. In each dimension, the attention space is selectably divided in either equal, substantially equal or unequal intervals.

Referring to FIG. 1b, each supported attention space preferably is a sphere 57. Accordingly, the R-dimension preferably divides such sphere 57 using concentric spheres, with a priority number being assigned to each region between successive spheres. In that assignment, the regions closer to the center of sphere 57 preferably receive higher priorities (e.g., smaller-valued priority numbers). In turn, the $\beta$-dimension preferably divides such sphere 57 using coaxial cones whose vertices are at the center of tie sphere 57. Priority numbers are assigned to the regions between successive cones. In that assignment, the inner-most cone preferably receives the highest priority (e.g., the smallest-valued priority number), with the priorities decreasing for regions formed as the internal angle of rotation becomes larger.

Moreover, in the divisions of the dimensions, the size of the regions preferably is controlled by selecting the value of the dividing interval(s) associated with each dimension. In that regard, smaller regions generally are provided by selecting relatively smaller values for the dividing interval(s). On the other hand, larger regions generally are provided by selecting relatively larger values for the dividing interval(s).

In establishing the regions, either integer or floating point operations can be used. It is understood that employing integer operations provides relatively less computational load while employing floating point operations provides relatively more precision.

Examples of division forms in the R- and $\beta$-dimensions include:

(a) for equal division in the R-dimension, the dividing radii are increased in equal increments (e.g., $i*R/n$, where $i=0,1,2\ldots n$) from 0 to the radius R of a selected attention sphere (sometimes referred to hereafter as R-division);

(b) for unequal division in the R-dimension, the dividing radii are increased in unequal increments (e.g., based on $SQRT[i*R^2/n]$ where $i=0,1,2\ldots n$) from 0 to the radius R of a selected attention sphere (sometimes referred to hereafter as $R^2$-division);

(c) for equal division in the $\beta$-dimension, the dividing cones' internal angles of rotation are increased in equal angular increments (e.g., $i*180°/n$, where $i=0,1,2\ldots n$) from 0 to 180 degrees in sweeping out a selected attention sphere (sometimes referred to hereafter as β-division); and (d) for unequal division in the β-dimension, the dividing cones' internal angles of rotation are increased in unequal angular increments (e.g., based on i*2/n, where i=0,1,2 . . . n) from 0 to 1 in sweeping out a selected attention sphere (sometimes referred to hereafter as cos β-division).

The values of "n" in the above expressions can be different for different division forms as well as for different senses. Developers can select "n" so as to provide finer or coarser regions. For example, developers may select "n" for coarse division if the rendering engine can only handle a small number of quality levels (e.g., four levels of animation). Moreover, other division forms can be employed without departing from the principles of the invention.

Choosing division forms for each dimension leads to various combinations. Of the possible combinations (including those based on division forms other than the examples), four are described below: (i) the combination of R-division and β-division; (ii) the combination of $R^2$-division and cos β-division; (iii) the combination of R-division and cos β-division; and (iv) the combination of $R^2$-division and β-division. It is understood that, for the senses of sight and hearing, the combination of $R^2$-division and cos β-division generally approaches the behavior of the real world. It is also understood that division along only a single dimension can be used in the priority computation, without departing from the principles of the invention.

Each combination provides priority numbers to the objects in A's attention space. In so providing priority numbers, each combination preferably generates three base priority structures. A first structure contains priority numbers assigned in R-dimension, e.g., using R- or $R^2$-division. A second structure contains priority numbers assigned in the β-dimension, e.g., using β- or cos β-division. A third structure contains composite priority numbers from both dimensions. (A structure is a base priority structure if the priority numbers thereof are computed from only the base parameter. A structure is a modified priority structure if the priority numbers thereof are computed from the base parameter and one or more of the modifying parameters.)

The general form of a base priority structure respecting the above dimensions and divisions is:

{type-of-division $(A_i P_i)$*} to where $A_i$ is the ith object's identifier; $P_i$ is the priority number of $A_i$ using the division form indicated by type-of-division; and the '*' means zero or more pairs of $(A_i, P_i)$. Valid types-of-division include, for example, R, R2, B, C, RB, RC, R2C, and R2B, where R represents R-division, R2 represents $R^2$-division, B represents β-division, C represents cos β-division. The first four of the valid types-of-division indicate that priority numbers are generated by dividing the sense sphere along one dimension using only the indicated division form. The last four of the valid types-of-division indicate that composite priority numbers are generated by dividing the sense sphere along two dimensions using the indicated, corresponding division forms.

Preferably, the smaller the priority number the higher the priority. However, it is understood that higher priority can be associated with larger priority numbers. Generally, the priority numbers can be other than numbers; rather, any selected designation ranking priority in the attention space (e.g., by mapping the numbers $P_i$ in the priority structure to the selected ranking system) can be used without departing from the principles of the invention.

It is understood that developers can configure their respective systems as to priority computation. For example, developers can select (i) one of the above division forms, or other division forms, for computing priorities, (ii) all or a subset of the three priority structures and (iii) the parameters employed in implementing the combinations and priority structures, as well as the associated computations. The selected configuration generally is responsive to various factors, including, available system resources and specifics of the application domain (e.g., the assessed importance of each priority structure to controlling the rendering of objects of different media or of different aspects of the same media).

In a system supporting source and media objects, the object identifiers in the base priority structure represent source objects. However, as described further below, priority modification may replace affected source objects by associated media objects. (As with participants, avatars and objects, source objects generally are represented by italicized capital letters; media objects are generally denoted using the associated source object letter, together with an extension, e.g. ".m".)

A. Computing Priority Using R-division and β-division

In this approach to computing priorities, the attention space's sphere 57 is divided using R-division and β-division. To illustrate in first person view, let D be the distance between avatar A and an object resident in A's attention space; let d be the radial interval used to divide the sphere 57 in the R-dimension (i.e., using concentric spheres); and let $P_d$ be the priority numbers assigned to resident objects. One computation for $P_d$ is:

$P_d = D/d$

Although this computation is a floating point operation, it is to be recognized that $P_d$ can be computed as an integer (e.g., by truncating the quotient), without departing from the principles of the invention.

Using this computation, Table 1 shows exemplary values of $P_d$ for ranges of D, when R=50 and d=17. In the first column, for instance, Table 1 shows that, when 0<=D<17, $P_d$ has a value of between 0 and 1, which preferably indicates a high priority.

TABLE 1

| D | 0–17 | 17–34 | 34–50 |
|---|---|---|---|
| $P_d$ | 0–1 | 1–2 | 2–3 |

In this approach, the attention space's sphere 57 is also divided using coaxial cones, the cones having common axis AA". To illustrate, let b be the angular interval used β-division and let $P_b$ be the priority number assigned to an object resident in regions of this space. One computation for $P_b$ is:

$P_b = \beta/b$ where 0°<=β<=180° and β, as an angle of rotation, is symmetrical about the axis AA". Using this computation, Table 2 shows exemplary values of $P_b$ for ranges of β when b=22.5°. In the first column, for instance, Table 2 shows that, when β is between 0° and 22.5°, $P_b$ has a value between 0 and 1.

TABLE 2

| β | 0°–22.5° | 22.5°–45° | 45°–67.5° | 67.5°–90° | 90°–112.5° | 112.5°–135° | 135°–157.5° | 157.5°–180° |
|---|---|---|---|---|---|---|---|---|
| $P_b$ | 0–1 | 1–2 | 2–3 | 3–4 | 4–5 | 5.6 | 6–7 | 7–8 |

Preferably, the priority numbers of objects within A's focus cone (e.g., the gaze cone) are decreased in value, thereby increasing the associated priority. If the decrease is by an amount designated by $P_g$, the composite priority numbers $P_1$ for each object in A's attention space become:

$$P_1 = W_d * P_d + W_b * P_b - W_g * P_g$$

where (i) the subscript 1 indicates that the priority is computed using R-division and β-division, (ii) $w_d$, $w_b$ and $w_g$ comprise weight coefficients, the weight coefficients being individually and/or collectively selectable and (iii) $P_g > 0$ for objects inside A's focus cone, and $P_g = 0$ for objects outside A's focus cone. The weight coefficients, in one respect, indicate the relative importance of the priority terms in the computation. As an example, when $w_d = 1$, $w_b = 2$, $w_g = 3$, the most important term is selected to be whether or not an object is in the focus cone, followed by the object's location in the β-dimension and, finally, by its location in R-dimension. As another example, when $w_d = w_b = w_g = 1$, all weight terms are deemed of equal importance and, accordingly, contribute equally to the priority number assignments.

With $P_1$ as defined above, this approach generates one or more of the following base priority structures:

$$R = \{R(A_1 P_{d1})(A_2 P_{d2}) \ldots (A_n P_{dn})\}$$

$$B = \{B(A_1 P_{b1})(A_2 P_{b2}) \ldots (A_n P_{bn})\}$$

$$RB = \{RB(A_1 P_{11})(A_2 P_{12}) \ldots (A_n P_{1n})\}$$

Figure 4:
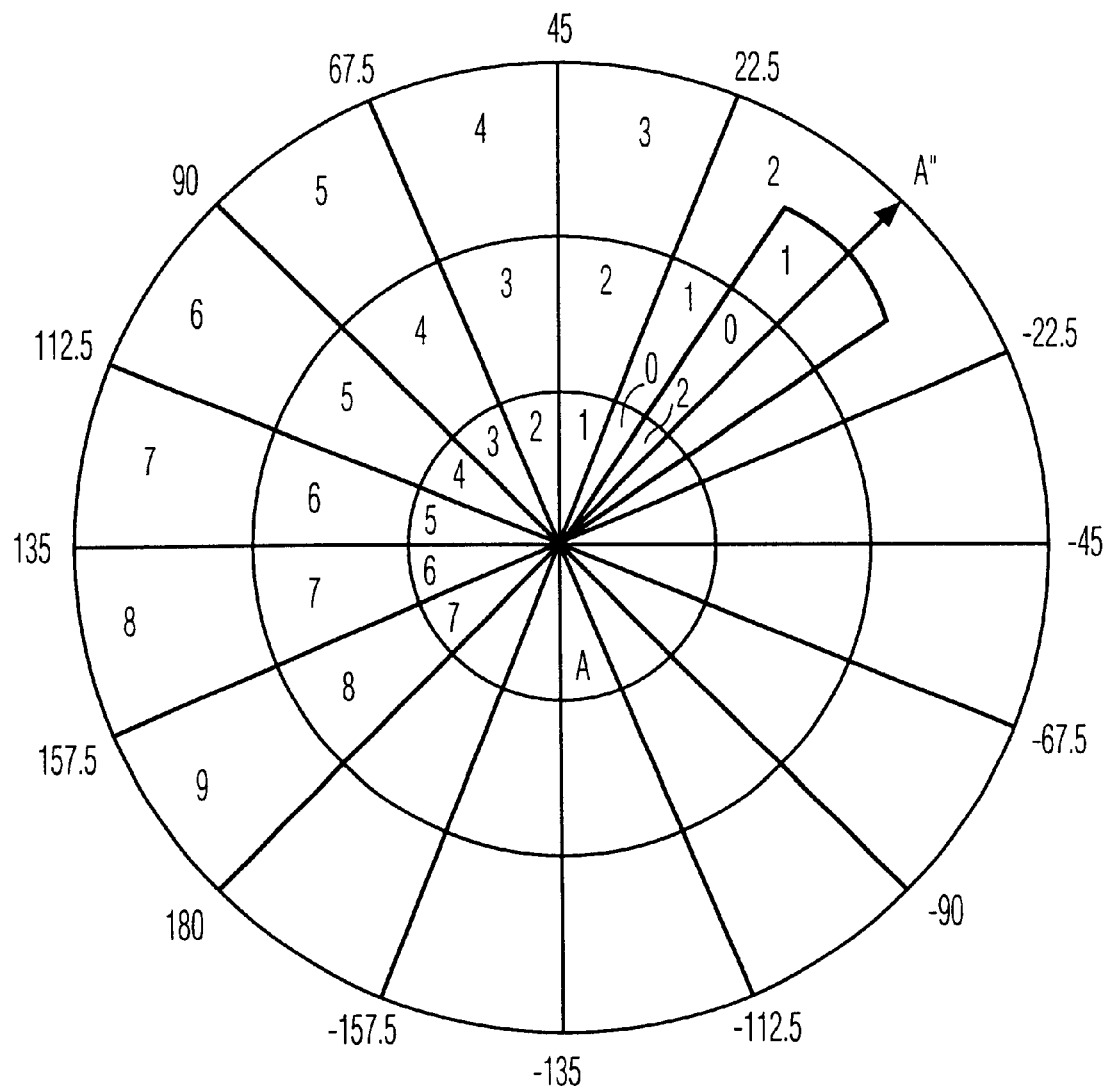
FIG. 4 showing one embodiment of a priority component's priority regions as projected in a plane containing the center of the focus and sense spheres and the focus and sense vectors, according to the principles of the invention.

FIG. 4 shows the projection of the priority regions in a plane containing the center of the attention space's sphere 57 and containing the sense and focus vectors. As previously described, the regions are generated using R=50, d=17, and b=22.5°. Although only two-dimensional portions of each region are shown, the attention space's sphere 57 is divided into 27 regions (24 due to rotational divisions and 3 due to the focus cone). The area enclosed by the heavy lines is the projection of A's focus cone. The priority numbers $P_1$ are computed with $P_g = 1$, $w_b = w_d = w_g = 1$ and $P_1$ is truncated to be an integer.

B. Computing Priority Using $R^2$-division and cos β-division

In this approach to computing priorities, the attention space's sphere 57 is divided using $R^2$-division and cos β-division. Advantages of using these division forms include that the divisions approximately comport with human visual and auditory perceptions, these perceptions being generally proportional to $1/R^2$ and $1/\cos \beta$.

To illustrate, let $D^2$ be the square of the distance between avatar A and an object resident in A's attention space; let d2 be the radial interval used to divide the sphere 57 in the R-dimension (i.e., using concentric spheres); and let $P_{d2}$ be the priority numbers assigned to the resident object. One computation for $P_{d2}$ is:

$$P_{d2} = D^2 / d2$$

where the quotient preferably is obtained by floating point division. It is to be recognized, however, that the computation can be accomplished other than by using floating point division, without departing from the principles of the invention.

Using this computation, Table 3 shows exemplary values of $P_{d2}$ for ranges of D, when R=50 and $d2 = R^2/3 = 833$. In the second column, for instance, Table 3 shows that, when $29 <= D < 41$, $P_{d2}$ has a value of between 1 and 2.

TABLE 3

| D | 0–29 | 29–41 | 41–50 |
|---|---|---|---|
| $D^2$ | 0–833 | 833–1667 | 1667–2500 |
| $P_{d2}$ | 0–1 | 1–2 | 2–3 |

In this approach, the attention space's sphere 57 is also divided using coaxial cones, the cones having common axis AA". Priority numbers are again assigned to the regions between successive coaxial cones. In that assignment, the inner-most cone preferably receives the smallest-valued priority number, with the values increasing as the internal angle of rotation becomes larger. More specifically, however, in the β-dimension, it is preferred to assign smaller (i.e., higher priority) values to the larger cosine-valued regions (i.e., regions closer to AA").

To illustrate, let c be the cosine interval used to divide the β-dimension, and let $P_c$ be the priority number assigned to an object resident in regions of this dimension. One computation for $P_c$ is:

$$P_c = (1 - \cos \beta)/c$$

where $0° <= \beta <= 180°$ and it being understood that β, as an angle of rotation, is symmetrical about the axis AA". Using this computation, Table 4 shows exemplary values of $P_c$ for ranges of β derived from intervals of cos β based on c=0.25. In the last column, for instance, Table 4 shows that, when cos βs interval is from −0.75 to −1, angle βs range is from 139° to 180° and the value of $P_c$ runs from 7 to 8.

TABLE 4

| cos β | 1–0.75 | 0.75–0.5 | 0.5–0.25 | 0.25–0 | 0—−0.25 | −0.25—−0.5 | −0.5—−0.75 | −0.75—−1 |
|---|---|---|---|---|---|---|---|---|
| β | 0°–41° | 41°–60° | 60°–76° | 76°–90° | 90°–104° | 104°–120° | 120°–139° | 139°–180° |
| $P_c$ | 0 | 1–2 | 2–3 | 3–4 | 4–5 | 5–6 | 6–7 | 7–8 |

Here, as when computing priority using R-division and β-division, the priority numbers of objects within A's focus cone (e.g., the gaze cone) preferably can be decreased in value, thereby increasing the associated priority. If the decrease is by an amount designated by $P_g$, the composite priority numbers $P_2$ for each object in A's attention space become:

$$P_2 = W_{d2} * P_{d2} + W_c * P_c - W_g * P_g$$

where (i) the subscript 2 indicates that the priority is computed using $R^2$-division and cos β-division, (ii) $Wd_{d2}$, $W_c$ and $W_g$ comprise weight coefficients, the coefficients being individually and/or collectively selectable and (iii) $P_g > 0$ for objects inside A's focus cone, and $P_g = 0$ for objects outside A's focus cone. The weight coefficients have the same import as previously described.

With $P_2$ as defined above, this approach generates one or more of the following base priority structures:

$$R2 = \{R2(A_1P_{d21})(A_2P_{d22}) \ldots (A_nP_{d2n})\}$$

$$C = \{C(A_1P_{c1})(A_2P_{c2}) \ldots (A_nP_{cn})\}$$

$$R2C = \{R2C(A_1P_{21})(A_2P_{22}) \ldots (A_nP_{2n})\}$$

Figure 5:
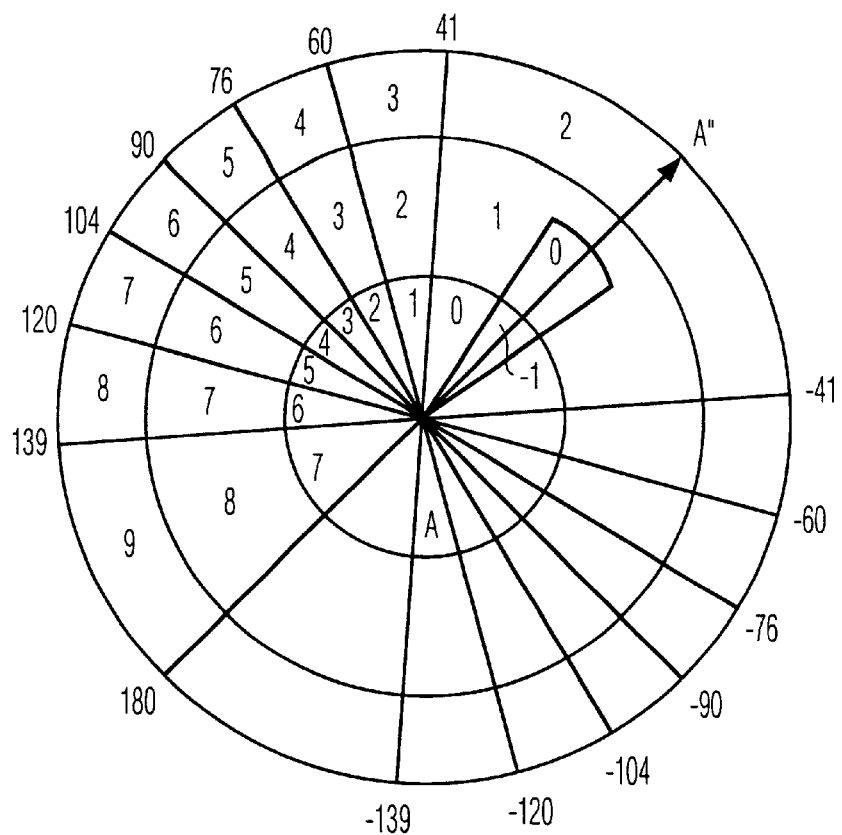
FIG. 5 showing one embodiment of a priority component's priority regions as projected in a plane containing the center of the focus and sense spheres and the focus and sense vectors, according to the principles of the invention.

FIG. 5 shows the projection of the priority regions in a plane containing the center of the attention space's sphere 57 and containing the sense and focus vectors. As previously described, the regions are generated using R=50, d2=833, and c=0.25. Although only two-dimensional portions of each region are shown, the attention space's sphere 57 is again divided into 27 regions. The area enclosed by the heavy lines is again the projection of A's focus cone. The priority numbers $P_2$ are computed with $P_g=1$, $W_{d2}=W_c=W_g=1$ and $P_2$ is truncated to the integer.

Compared with FIG. 4, the priority numbers assigned to the regions are the same except the regions unevenly divide the attention space's sphere 57 in both the R- and β-dimensions.

C. Computing Priority Using R-division and cos β-division

In this approach to computing priorities, the attention space's sphere 57 is divided using R-division and cos β-division. The computations described above for these two division forms can be applied here. Accordingly, $P_d$ comprises the priority numbers assigned to resident objects using R-division and $P_c$ comprises the priority numbers assigned to resident objects using cos β-division. The computations for $P_d$ and $P_c$ are:

$$P_c = (1-\cos \beta)/c \text{ and } P_d = D/d$$

where $0° <= <= 180°$, and the other symbols denote the values previously stated. As previously described, the computation of $P_d$ can include integer operations, without departing from the principles of the invention.

As in the above approaches, the priority numbers of objects within A's focus cone (e.g., the gaze cone) preferably can be decreased in value, thereby increasing the associated priority. If the decrease is by an amount designated by $P_g$, the composite priority numbers $P_3$ for each object in A's attention space become:

$$P_3 = W_d * P_d + W_c * P_c - W_g * P_g$$

where (i) the subscript 3 indicates that the priority is computed using R-division and cos β-division, (ii) $w_d$, $W_c$ and $w_g$ comprise weight coefficients, the coefficients being individually and/or collectively selectable and (iii) $P_g > 0$ for objects inside A's focus cone, and $P_g = 0$ for objects outside A's focus cone. The weight coefficients have the same import as previously described.

With $P_3$ as defined above, this approach generates one or more of the following base priority structures:

$$R = \{R(A_1P_{d1})(A_2P_{d2}) \ldots (A_nP_{dn})\}$$

$$C = \{C(A_1P_{c1})(A_2P_{c2}) \ldots (A_nP_{cn})\}$$

$$RC = \{RC(A_1P_{31})(A_2P_{32}) \ldots (A_nP_{3n})\}$$

Figure 6:
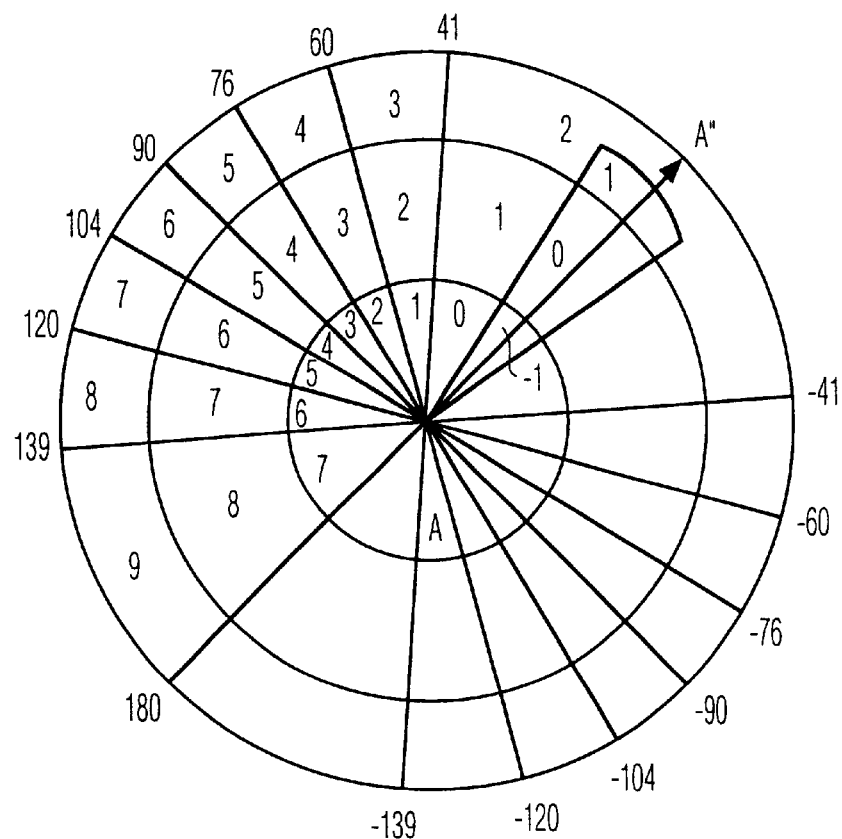
FIG. 6 showing one embodiment of a priority component's priority regions as projected in a plane containing the center of the focus and sense spheres and the focus and sense vectors, according to the principles of the invention.

FIG. 6 shows the projection of the priority regions in a plane containing the center of the attention space's sphere 57 and containing the sense and focus vectors. As previously described, the regions are generated using R=50, d=17, and c=0.25. Although only two-dimensional portions of each region are shown, the attention space's sphere 57 is again divided into 27 regions and the area enclosed by the heavy lines again is the projection of A's focus cone. The priority numbers $P_3$ are computed with $P_g=1$, $w_d=W_c=w_g=1$ and $P_3$ is truncated to the integer.

Compared with FIG. 4, the priority numbers assigned to the regions are the same except the regions unevenly divide the attention space's sphere 57 in the β-dimension. Compared with FIG. 5, the priority numbers assigned to the regions are the same except the regions evenly divide the attention space's sphere 57 in the R-dimension.

D. Computing Priority Using $R^2$-division and β-division.

In this approach to computing priorities, the attention space's sphere 57 is divided using $R^2$-division and β-division. The computations described above for these two division forms can be applied here. Accordingly, $P_{d2}$ comprises the priority numbers assigned to resident objects using $R^2$-division and $P_b$ comprises the priority numbers assigned to resident objects using β-division. The computations for $P_{d2}$ and $P_b$ are:

$$P_{d2} = D^2/d2 \text{ and } P_{b-\beta/b}$$

where $0° <= \beta <= 180°$ and the other symbols denote the values previously stated.

As in the above approaches, the priority numbers of objects within A's focus cone (e.g., the gaze cone) preferably can be decreased in value, thereby increasing the associated priority. If the decrease is by an amount designated by $P_g$, the composite priority numbers $P_4$ for each object in A's attention space become:

$$P_4 = W_{d2} * P_{d2} + W_b * P_b - W_g * P_g$$

where (i) the subscript 4 indicates that the priority is computed using $R^2$-division and β-division, (ii) $W_{d2}$, $w_b$ and $w_g$ comprise weight coefficients, the coefficients being individually and/or collectively selectable and (iii) $P_g > 0$ for objects inside A's focus cone, and $P_g = 0$ for objects outside A's focus cone. The weight coefficients have the same import as previously described.

With $P_4$ as defined above, this approach generates one or more of the following base priority structures:

$$R2 = \{R2(A_1P_{d21})(A_2P_{d22}) \ldots (A_nP_{d2n})\}$$

$$B = \{B(A_1P_{b1})(A_2P_{b2}) \ldots (A_nP_{bn})\}$$

$$R2B = \{R2B(A_1P_{41})(A_2P_{42}) \ldots (A_nP_{4n})\}$$

Figure 7:
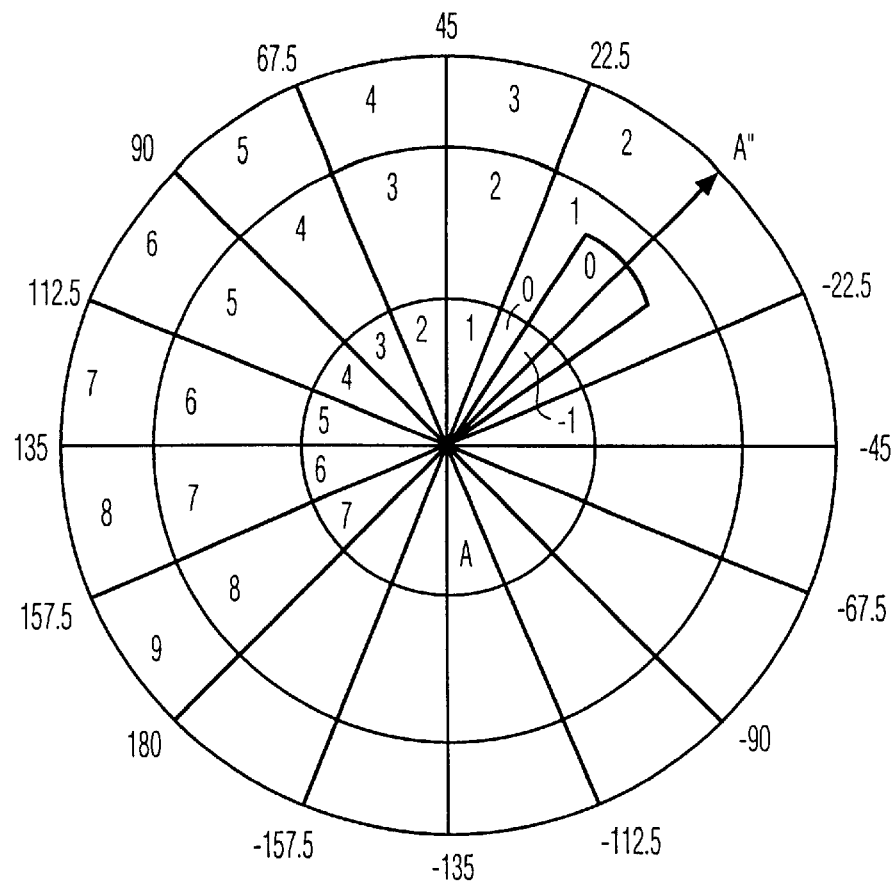
FIG. 7 showing one embodiment of a priority component's priority regions as projected in a plane containing the center of the focus and sense spheres and the focus and sense vectors, according to the principles of the invention.
Figure 8:
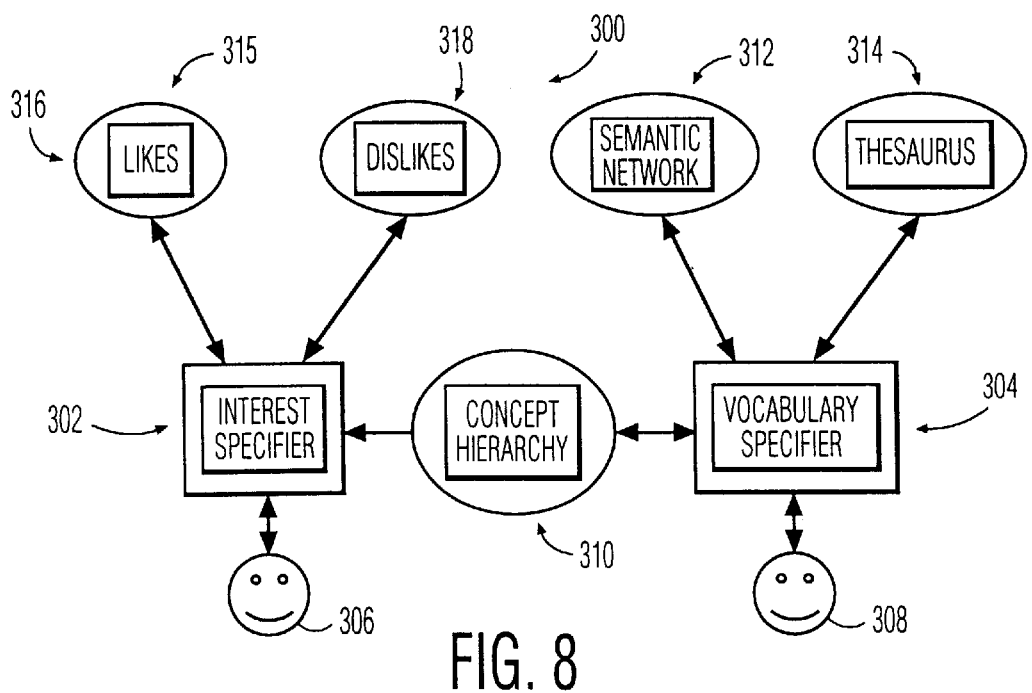
FIG. 8 showing an interest specification tool, responsive to selection of interest parameters associated with the priority component, and including an interest specifier component and a vocabulary specifier component.

FIG. 7 shows the projection of the priority regions in a plane containing the center of the attention space's sphere 57 and containing the sense and focus vectors. As previously described, the regions are generated using R=50, d2 =833, and b=22.5°. Although only two-dimensional portions of each region are shown, the attention space's sphere 57 is again divided into 27 regions and the area enclosed by the heavy lines again is the projection of A's focus cone. The priority numbers $P_4$ are computed with $P_g=1$, $W_{d2}=W_b=W_g=1$ and $P_4$ is truncated to the integer.

Compared with FIG. 4, the priority numbers assigned to the regions are the same except the regions unevenly divide the attention space's sphere 57 in the R-dimension. Compared with FIG. 5, the priority numbers assigned to the regions are the same except the regions evenly divide the attention space's sphere 57 in the β-dimension. Compared with FIG. 6, the priority numbers assigned to the regions are the same except the regions evenly divide the attention space's sphere 57 in the β-dimension and unevenly divide the attention space's sphere 57 in the R-dimension.

E. Additional Discussion

The above describes the decreasing of priority numbers for objects within A's focus cone (e.g., the gaze cone), so as to increase priority. In addition, it is understood that the priority numbers can also be decreased based on whether or not objects are in A's sense cone. Such decrease can be in place of or together with the decrease based on the focus cone. In the example of priority numbers $P_1$, use of both cones effects (i) a decrease for the focus cone by an amount designated by $P_f$ and (ii) a decrease for the sense cone by an amount designated by $P_s$. Accordingly, the priority numbers $P_1$ for each object in A's attention space 57 become:

$$P_1 = W_d*P_d + W_b*P_b - W_f*P_f - W_s*P_s$$

where $W_d$, $W_b$, $W_f$ and $W_s$ comprise weight coefficients, the coefficients being individually and/or collectively selectable. Similar reductions can be applied in the other priority structures described above.

2. Modifying Priority Structures Using Other Parameters

As illustrated above, base parameters preferably are employed to establish one or more base priority structures, these priority structures relating a priority number to each respective object in the applicable attention space. The priority numbers so computed preferably are subject to modification. The modification computations are based on one or more modifying parameters. One such modifying parameter is a participants profile which profile comprises, in a general sense, one or more lists of data directed to the participant's categorical views and opinions. Examples of the lists that may be provided include: friends, pests, public figures, and interests. Other modifying parameters can relate to (i) economics, (ii) parameters explicitly set by a developer or participant, and (iii) whether the participant is engaged in an interaction session. It is understood that other modifying parameters can be employed, without departing from the principle of the invention.

As stated above, in an embodiment that supports source and media objects, before any priority modification, the object identifiers in the base priority structure reference source objects. However, as is described further below, when the base priorities are adjusted according to modifying parameters, it is possible that priorities of different media objects associated with a single source object are modified differently. Accordingly, the priority component preferably provides priorities in steps, the steps comprising: 1) computing base priority numbers; 2) modifying the base priority numbers, so computed, according to modifying parameters; and 3) updating relevant priority structures based on the results of the modification.

While a modification may affect all media objects associated with a source object, other modifications may affect some, but not all, associated media objects. In the former case, the priority component preferably is implemented so that object identifiers remain unchanged in relevant priority structures. In the latter case, the priority component preferably is implemented so that, in relevant priority structures, the source object's identifier is replaced by the identifiers of all its associated media objects. As an example, if (a) source object $A_i$'s entry in a base priority structure is $(A_i P_i)$, (b) $A_i$ has three associated media objects, $A_i.m_1$, $A_i.m_2$, and $A_i.m_3$, and (c) a modification changes the priority of $A_i.m_1$ to $P_{i1}$, changes the priority of $A_i.m_3$ to $P_{i3}$, and leaves the priority of $A_i.m_2$ unchanged, then (d) after the modification, this source object's entry is replaced by three entries: $(A_i.m_1\ P_{i1})$, $(A_i.m_2\ P_i)$, and $(A_i.m_3\ P_{i3})$. In one embodiment, the replacement is performed for all base priority structures In the discussions that follow, it is understood that, for illustrative purposes, the previously-described base priority structure R2C=$\{R2C\ (A_1\ P_{21})(A_2\ P_{22})\ ...\ (A_n\ P_{2n})\}$ is employed, which structure is subject to modification using the modifying parameters. It is also understood that other base priority structures, when used, are modified in substantially the same way as described below for the R2C structure.

A. Friends and Pests

In a system according to the invention, a participant preferably is enabled to use the Set-Priority control to select, for priority computations, modifying parameters associated with the participant's views and opinions. Generally, the views and opinions are directed to other participants/objects in the environment. Moreover, the views and opinions typically include likes and dislikes.

To illustrate, Friends=$\{F_1, F_2, ..., F_m\}$ is a list of objects (e.g., other participants and/or their avatars) that the participant likes, and Pests=$\{S_1, S_2, ..., S_j\}$ is a list of objects (e.g., other participants and/or their avatars) that the participant dislikes. The ith member of Friends, $F_i$, is assigned a number $f_i$, $f_i=>0$ and $1<=i<=m$. The value of $f_i$ (sometimes referred to as a blocking factor) preferably increases with the degree to which the participant desires to monitor member i. Similarly, the ith member of Pests, $S_i$, is assigned a number $s_i$, $s_i=>0$ and $1<=i<=j$. The value of $s_i$ (sometimes referred to as a blocking factor) increases with the degree to which the participant desires to block signals transmitted from member i.

The numbers assigned to each of $F_i$ and $S_i$ preferably are assigned automatically by the system. These automatically assigned numbers can be generated in various ways. As an example, the numbers can be assigned as defaults, e.g., developer or participant selected constants for each respective list. As another example, the numbers can be progressive, according to a predetermined calculus, responsive to the location of any given entry in the respective lists. In such cases of automatic assignment, however, the participant preferably is enabled to alter the assigned numbers, e.g., by employing the Set-Priority control. Although automatic assignment is preferred, it is to be recognized that the numbers can be originally assigned by manual entry on the participant's part. For example, a participant can enter the originally-assigned priority of an object by using a slider in the Set-Priority control.

If object $A_i$ in structure R2C corresponds to $F_a$ in Friends, the base (or otherwise modified) priority number $P_{2i}$ becomes: $P_{2i} \leftarrow P_{2i} - f_a$. If object $A_i$ in structure R2C corresponds to $S_a$ in Pests, the base (or otherwise modified) priority number $P_{2i}$ becomes: $P_{2i} \leftarrow P_{2i} + S_a$.

Friends and Pests can be a single list. If a single list is used, the system preferably is enabled to assign a blocking factor $b_a$ to object A. This blocking factor contributes to the priority calculation according to the formula: $P_{2i} \leftarrow P_{2i}+b_a$. In the case where priority increases inversely with the priority number's value, (a) if $b_a>0$ (e.g., object A is in a Pests list), the larger the magnitude of $b_a$, the lower A's priority and (b) if $b_a<0$ (e.g., object A is in a Friends list), the larger the absolute value of $b_a$, the higher A's priority. Moreover, a negative-valued blocking factor preferably can be employed to indicate that the participant desires to receive the signals from an object A and, accordingly, can be used to request rendering enhancement.

In a system supporting source and media objects, it is understood that the modification of the priority of a source object $A_i$—based on a correlative entry in a Friends or a Pests list—correspondingly modifies priority numbers of the media objects. Such modification of the source object's priority preferably works a global, uniform modification of the priorities of the associated media objects. It is also preferred, however, that a system supports direct modification of priorities as to selected media objects based on Friends and/or Pests lists. In this case, the priorities of selected media objects are modifiable other than via modification of the associated source object's priority. As an example, in the event a source object has audio, video and animation media objects, the priorities of the media objects may be modified (i) by adjusting the source object's correlative entry in a Friends or a Pests list or (ii) by entering and/or adjusting the entry of selected one or more of the media objects in a Friends or a Pests list. In the latter case, if (a) the source object's entry in a priority structure is ($A_j$ $p_i$) and in the Friends list is ($F_i$ $f_i$) and (b) only the audio media object's priority is to be modified (e.g., by a blocking factor $f_{iau}$) using the Friends list, then (c) the source object's entry in the Friends list preferably is replaced by entries for each of the audio, video and animation media objects as follows: ($F_j \cdot m_{audio}$ $f_{iau}$)($F_j \cdot m_{video}$ $f_i$)($F_i \cdot m_{anim}$ $f_i$), where the blocking factor for the audio media object is given by and (d) the source object's entry in the priority structure preferably is replaced by entries for each of the audio, video and animation media objects as follows: ($A_i \cdot m_{audio}$ $P_{iau}$) ($A_i \cdot m_{video}$ $p_i$)($A_i \cdot m_{anim}$ $p_i$), where the cumulative priority for the audio media object is given by $P_{iau}=p_i-f_{iau}$. It is understood that use of a single list contemplates a similar application, using blocking factor $b_a$.

B. Public Figures

Virtual environments generally support public figures that broadcast in one or more media to all participant hosts, e.g., the audio stream of a public speaker or an advertisement. In a system implementing such an environment, a participant preferably is enabled to use the Set-Priority control to select, for priorities computation, a modifying parameter associated with public figures' broadcasts. As an example, the participant is enabled to select not only whether it desires to receive broadcasts from one or more categories of public figures, but also what media signals or broadcasts are received and at what priority.

In one embodiment, the participant selects by altering one or more default settings associated with such broadcasts. As an example, assume the default priority numbers for public figures B follow the priority structure Public={R2C ($B_1$ $P_{21}$)($B_2$ $P_{22}$) . . . ($B_n$ $P_{2n}$)}. Preferably, the participant is enabled to alter the default numbers by assigning a blocking factor $b_i$ to $B_i$, 1<=i<=n. The resultant priority numbers of B, follow the computation:

$$P_{2j} \leftarrow P_{2j}+b_i.$$

As with Friends/Pests, in the case where priority increases inversely with the priority number's value, the larger the magnitude of $b_j$'s positive value, the greater the priority number and, in turn, the lower the priority of signals from the public figure $B_i$. Conversely, the larger the absolute value of $b_j$, if $b_i$ is negative, the lesser the priority number and, in turn, the higher the priority.

In a system supporting source and media objects, it is understood that the modification of the priority of a public figure $B_i$ preferably is implemented the same as, or similar to, the modifying procedures previously described with Friends/Pests lists. In one case, priority modification of a source object correspondingly modifies priority numbers of the associated media objects, such corresponding modification preferably being global and uniform. In another case, however, priority modification can be effected directly as to selected media objects. In this case, while the priority numbers of only selected media objects are modified, the entry of the associated source object in a priority structure is replaced by all its media objects, including media objects that are not so modified. As an example, in the event a public figure source object has audio, video and text media objects, the priorities of the media objects may be modified (i) by adjusting the source object's priority in the Public priority structure or (ii) by entering and/or adjusting the entry of selected one or more of the media objects in the Public priority structure. In the latter case, if (a) the public figure's entry as a source object in the Public priority structure is ($B_j$ $P_i$) and (b) the priorities of the audio and text media objects are to be individually modified (e.g., by respective blocking factors $b_{iau}$ and $b_{itext}$), then (c) the source object's entry in the priority structure preferably is replaced by entries for each of the audio, video and text media objects as follows: ($B_j \cdot m_{audio}$ $P_{iau}$)($B_i \cdot m_{video}$ $P_i$)($B_j \cdot m_{text}$ $P_{itext}$), where the cumulative priority for the audio media object is given by $P_{iau}=P_i-b_{iau}$ and the cumulative priority for the text media object is given by $P_{itext}=P_i-b_{itext}$. Because the blocking factor is subtracted in this formula (cf., the formula when using a single Friends/Pests list) and providing that priority increases inversely with the priority number's value, (a) if $b_{ix}<0$, the blocking factor works to increase $B_i \cdot m_x$'s priority (e.g., magnify signals) and (b) if $b_{ix}<0$, the blocking factor works to lower $B_j \cdot m_x$'s priority (e.g., block signals).

In any case, the Public priority structure (resultant or, if not modified, default) preferably is a part of the overall priority structures (base and/or modified) containing numbers associated with objects in the applicable attention space's sphere 57.

C. Shared Interests

In a system according to the invention, a participant preferably is enabled to use the Set-Priority control to select a modifying parameter associated with having shared interests with other objects. In one embodiment, participants use the Set-Priority control to instruct the system to compute a measure of interest similarity between themselves and other objects resident in the applicable attention space. This similarity measure preferably is employed to alter base priority numbers.

As an example, a relatively high value for a similarity measure of a desirable object (e.g., a celebrity's avatar) preferably is associated with a reduction in the avatar's priority number and, accordingly, results in enhanced priority. As another example, a relatively low value for a similarity measure of an undesirable object (e.g., the avatar of a lawyer who is soliciting clients) preferably is associated with an increase in the avatar's priority number and, accordingly, results in reduced priority. As an additional example, however, a relatively low-valued similarity measure can be associated with an object (e.g., a physicist's avatar), but nevertheless can result in reduction of the avatar's priority number, the reduction serving to enhance priority. So enhancing priority enables participant, an opportunity to perceive (and potentially give attention to) avatars having divergent interests. In turn, the participant becomes open to new ideas, unusual experiences and, generally, to go where they might never have gone before in the virtual environment.

Broadly, presence and absence of shared interests can be selectably employed. Preferably, interests are selected by one or more categories and types. In any case, the interests ultimately provide for increasing or decreasing priorities, or even leaving priorities unchanged.

If the similarity measure is denoted as $sim_j$, the results of the similarity computation can be represented by a modifying priority structure Sim that contains similarity values for each object $A_i$ resident in the applicable attention space:

$$Sim=\{(A_i, sim_i)\}$$

where $1<=i<=n$ and $-1<sim_i<1$. The greater the magnitude of $sim_i$'s positive value, the more similar the object $A_i$ is to A. The greater the absolute value of $sim_i$, if $sim_i$ is negative, the more dissimilar the object $A_i$ is to A. Accordingly, if the participant wants to sense dissimilar objects, the base (or otherwise modified) priority number $P_i$ associated with an object $A_i$ preferably is modified by the similarity measure, as follows: $P_i \leftarrow P_i + w_{sim}*s*sim_j$. On the other hand, if the participant wants to sense similar avatars, the priority number $P_i$ is modified by the similarity measure, as follows: $P_i \leftarrow P_i - W_{sim}*s*sim_i$. In both cases, s s a positive scaling factor and $w_{sim}$ is a weighting factor. The scaling factor s is directed to bring the value of $sim_i$ into a comparable range as $P_i$. For example, if $-5<P_i<10$, s can be 10. The weighting factor $w_{sim}$ preferably is determined—by the system and/or participant—to reflect the importance of the similarity measure relative to other factors in the overall priority number.

In a system supporting source and media objects, it is understood that priority modification for an object based on a similarity measure preferably is implemented the same as, or similar to, the modifying procedures previously described. In one case, priority modification of a source object correspondingly modifies priority numbers of the associated media objects, such corresponding modification preferably being global and uniform among the media objects. In another case, however, priority modification can be effected directly as to selected media objects. In a specific example, the system an enable a participant (e.g., via the Set-Priority control) to configure the similarity measure so that it contributes to priority modification of selected media objects, such objects being restricted to specified types (e.g., text and audio). In this case, while the priority numbers of only selected media objects are modified, the entry of the associated source object in a priority structure is replaced by all its media objects, including media objects that are not so modified.

It is understood that the similarity measure can be generated using various computations, without departing from the principles of the invention. It is preferred, however, that the computation respond to selected criteria. Examples of such criteria include:

(i) the computation provides a fair framework: to take into account that (a) one or more mixtures of list types can appear in participant profiles, e.g., any subset of likes, dislikes, friends, pests and other supported lists, (b) one or more lists can contain any subset of concepts, such concepts being expressed in potentially divergent vocabulary of any language common to the participant's avatar and a resident object, and (c) the items in the lists can be weighted;

(ii) the computation generates results in a bounded range preferably having intuitive semantic meaning;

(iii) the computation is relatively straightforward and generally fast; and (iv) computations are amenable to regular, irregular or triggered activation, such activation reducing system loading (e.g., activation when overall demands on the system are relatively light) and responding to both the general infrequency of profile changes and the substantial non-criticality of accuracy in the similarity measure.

(The phrase fair framework, as used above, connotes the substantial absence of bias toward any particular circumstance, situation or result.)

In one embodiment, the similarity measure's computation employs a $\cos \theta$ computation in multi-dimensional space, where $\theta$ is the angle between the two profile vectors, the profile vectors being derived ultimately from profile structures. In this computation, it is preferred that the developer and/or participant selects the profile structures for the computation. As an example, the selected profile structures can be interest structures, such as the lists likes and dislikes. Although this example includes two lists of specific:, complementary types, it is understood that other numbers of lists and/or other types of structures can be employed, including non-complementary lists, without departing from this principles of the invention.

The selected interest structures preferably are organized to include (i) one or more topics t, (ii) associated weights w, the weights preferably being integers and, in any case, indicating the participant's interest level in the topic (e.g., a larger weight for an entry in a likes list indicates a higher favorable interest in the entry, whereas a larger weight for an entry in a dislikes list indicates a higher unfavorable interest in the entry).

As an example, for the case of participants A and B, lists likes and dislikes comprise:

$$likes_a=\{(t_{al1}, w_{al1})(t_{al2}, w_{al2}) \ldots (t_{alm}, w_{alm})\}$$

$$dislikes_a=\{(t_{ad1}, w_{ad1})(t_{ad2}, w_{ad2}) \ldots (t_{adn}, w_{adn})\}$$

$$likes_b=\{(t_{bl1}, w_{bl1})(t_{bl2}, w_{bl2}) \ldots (t_{blp}, w_{blp})\}$$

$$dislikes_b=\{(t_{bd1}, w_{bd1})(t_{bd2}, w_{bd2}) \ldots (t_{bdp}, w_{bdp})\}$$

For these example lists, (i) subscripts a and b associate the lists to participants A and B, respectively, (ii) subscripts l and d differentiate likes entries from dislikes entries and (iii) integer subscripts indicate different topics.

In the context of this example, a similarity computation preferably follows the steps:

For each participant of the computation, merge their lists to provide an interest list. (A sort operation preferably is performed in association with the merge, but can be omitted without departing from the principles of the invention.) The merge step provides for topics in the interest list to comprise the union of the topics of the merged lists. The weights for the topics in both the likes and dislikes lists preferably are positive integers; however, because the two are complementary types, the weights for the topics in the dislikes list preferably are negated in the interest list. Accordingly, if a particular topic appears in both the likes and dislikes lists, the net weight $w_{xi}-w_{xd}$ is used in the interest list. The interest lists formed for the participants in this example are:

Interest list$_a$={$(t_{a l1}, w_{a l1})$ ... $(t_{alm}, w_{alm})(t_{ad1}, w_{ad1})$ ... $(t_{adn}, -w_{adn})$}

Interest list$_b$={$(t_{b l1}, w_{b l1})$ ... $(t_{alp}, w_{blp})(t_{bd1}, w_{bd1})$ ... $(t_{bdq}, -w_{bdq})$}

Compute the union of the interest lists of A and all the participants in consideration, $U_a$={$(O_i)^*$}, where $O_i$ is an identifier for a topic and participants in consideration preferably include the participants whose avatars are currently resident or have been recently resident in A's attention space's sphere 57 ("recently" preferably denotes a time tolerance established by the participant, by the developer or by a computation). The union preferably comprises the topics in all interest lists, with no weights attached. In this example using the interest lists of A and B, if $t_{a l1}$ is the same as $t_{b l2}$ while $t_{ad(n-1)}$ is the same as $t_{bd1}$, $U_a$ is stated as:

$U_a$={$(t_{a l1})$ ... $(t_{alm})(t_{ad1})$ ... $(t_{adn})(t_{b l1})(t_{b l3})$ ... $(t_{blp})(t_{bd2})$ ... $(t_{bdq})$} where the subscript "a" in $U_a$ indicates, the union is for A's computations.

Form respective profile vectors for A and every B resident in A's attention space, each such vector being based on the respective union $U_a$ and having as entries signed weights. If a topic exists in the applicable union but is omitted in an interest list, the associated profile vector includes a value of 0 for the corresponding vector entry. In this example, the vectors $V_a$ and $V_b$ for A and B, respectively, are:

$V_a$=[$W_{a l1}$, ... $W_{alm}$, $-W_{ad1}$, ... $W_{adn}$, 0, ... 0, 0, ... , 0 ]

$V_b$=[$W_{b l2}$, 0, ... , 0, 0, $-W_{bd1}$, 0, $W_{b l1}$, $W_{b l3}$, ... , $W_{blp}$, $-W_{bd2}$, ... , $-W_{bdq}$]

Compute the cosines between vector $V_a$ of A and each of the vectors $V_b$ associated with resident avatars, the resulting cosine values providing the respective similarity measures. In this example, vectors $V_a$ and $V_b$ have a cosine given by:

$Sim_{ab}$=$(V_a@V_b)/|V_a|*|V_b|$ where @ is the dot product, and $|V_a|$ and $|V_b|$ are the size of the two vectors, the size being the square root of the sum of the squares of each entry in the respective vector.

As computed in this embodiment, the value of the similarity measure ranges from −1 to 1. In that range, positive values preferably are interpreted to indicate relatively higher similarity than is indicated by negative values and zero. In addition, positive values of greater magnitude preferably are interpreted to indicate relatively higher similarity than is indicated by positive values of lesser magnitude. Moreover, negative values of greater absolute values preferably are interpreted to indicate higher dissimilarity than is indicated by negative values of lesser absolute values.

A similarity measure valued at 1 indicates identical interest lists, i.e., identical topics with identical weights. Conversely, a similarity measure valued at −1 indicates opposite interest lists. Opposite interest lists arise when the topics in a first participant's likes list are identical to the topics in the second participant's dislikes list and the topics in the first participant's dislikes list are identical to the topics in second participant's likes list, with the corresponding weights being identical.

For applications wherein the accuracy of the similarity computation is not critical, the similarity results for participants/avatars encountered by a participant are stored for a selected so time period. Stored results can be employed in the event that implicated system resources are sufficiently loaded to preclude computation of a current similarity measure. Stored results for such employ reflect an assumption that profile structures tend to remain relatively unchanged over a time period (e.g., an empirical, calculated or selected time period) following the encounter associated with the stored result. Even so, it is preferred that stored results are not employed after the applicable time period has elapsed. It is also preferred that the similarity measure be re-computed once resources become available.

Previously un-encountered participants may arrive in A's attention space, bearing a profile structure that is not reflected by the existing union. In general, such arrival preferably triggers the system to re-compute the similarity measures, taking into account the new profile structure. However, if the system resources are loaded, the system preferably employs the existing union to estimate the similarity measure between A and the new participant/avatar. It is also preferred that, when resources become available, the similarity measures are re-computed.

So as to reduce the frequency of similarity computations under these and other circumstances, the system can be implemented to provide A with an active-visitors data store for storing and updating the relevant profile structures of participants in consideration. The union is computed using the profile structures in this data store. Preferably, a timer is associated with each participant's data store entry. When a participant without a data store entry enters A's relevant attention space so as to cause its profile structure to be initially added to the active-visitors data store (e.g., immediately or after a resident threshold time period in the space), a timer is associated with that participant, the timer being set to 0. Thereafter, if the participant leaves the space, the timer is incremented periodically. When the timer's value exceeds a predefined removal threshold (i.e., indicating that the participant has not returned to the space), the participant's profile structure preferably is removed from the active-visitors data store. However, if the participant returns to the space before the removal threshold is exceeded, the participant's timer is reset to 0. Moreover, upon return, the participant's entry is updated, e.g, as to the participant's current profile structure. It is to be recognized that the detection of the participant's entry, exit and re-entry of the space can be variously implemented in the system 8, without departing from the principles of the invention.

In a specific, hypothetical example, a participant has, an associated avatar A, as well as an attention space in which avatars B and C are currently resident. Moreover, avatars B and C are the only avatars in A's active-visitors data store. The relevant likes and dislikes lists are directed to musical topics, as follows:

likes$_a$={(classic, 5)(jazz, 4)(hard rock, 1)(soft rock, 5)}dislikes$_a$={(country, 4)(hard rock, 7)} likes$_b$={(hard rock, 5)(heavy metal, 8)(new age, 6)(soft rock, 2)}dislikes$_b$={(classic, 2)(cour'try, 6)} likes$_c$={(classic, 8)(jazz, 7)(opera, 3)(soft rock, 5)}dislikes$_c$={(country, 1)(hard rock, 2)}

The interest lists for A, B, and C are set forth below. Note that the weight in A's profile for hard rock is −6 in that such topic is listed in both likes and dislikes of A.

interest list$_a$={(classic, 5)(country, −4)(hard rock, −6)(jazz, 4)(soft rock, 5)} interest list$_b$={(classic, −2)(country, −6)(hard rock, 5)(heavy metal, 8)(new age, 6)(soft rock, 2)} interest list$_c$={(classic, 8)(country, −1)(hard rock, −2)(jazz, 7)(opera, 3)(soft rock, 5)}

The union of the interest lists is:
U$_a$={(classic)(country)(hard rock)(heavy metal)(jazz) (new age)(opera)(soft rock)} The vectors V$_a$, V$_b$ and V$_c$ are:

$V_a$=[5, −4, −6, 0, 4, 0, 0, 5]

$V_b$=[−2, −6, 5, 8, 0, 6, 0, 2]

$V_c$=[8, −1, −2, 0, 7, 0, 3, 5]

The similarity measures, using the formula set forth above, are:

Between A and B: sim$_{ab}$=−0.04

Between A and C: sim$_{ac}$=0.82 Accordingly, the computations indicate that participant of avatar A has interests that are more similar to those of the participant of avatar C, than to those of the participant of avatar B. The results can also be interpreted to indicate that avatars A and B are slightly dissimilar, whereas avatars A and C are relatively similar.

In a system supporting source and media objects, the similarity measure preferably is implemented so that topics include source and/or media objects. Moreover, in any case, the similarity measure preferably is implemented so that topics include concept objects.

Concept objects generally are described in words and phrases. As such, the similarity measure is subject to linguistic issues. As an example, among numerous avatars, the same topic is subject to being expressed in different words/phrases. As another example, a single word/phrase may refer to different topics. One solution to these issues is to employ a semantic network or thesaurus to identify synonyms and to map concept objects. This solution, however, tends to significantly increase computational complexity, particularly if it is used every time a word/phrase is entered by a participant.

Another solution to these issues is to enable a participant, in expressing interests, to choose from a predefined but extendable vocabulary. As shown in FIG. 13, this solution is implemented as an interest specification tool 300, the tool comprising an interest specifier component 302 and a vocabulary specifier component 304. The rectangles in the Figure represent logic, the ovals represent data, and the faces represent participants 306 and 308.

In specifying an interest structure, the participant 306 employs the interest specifier component 302 which component draws on the resources of a concept hierarchy 310 to provide a predefined vocabulary. If a participant 308 seeks to customize the vocabulary, the participant 308 employs the vocabulary specifier component 304 which component draws on the resources of a semantic network 312 and/or thesaurus 314. More specifically, the network 312 and thesaurus 314, through the vocabulary specifier component 304 enable the participant 308 both to map words provided by the participant 308 to a selected concept and to enter the concept at the specified location in the concept hierarchy 310. Once the concept is so entered, it preferably is available as well to non-mapping participant 306. Because vocabulary extensions preferably arise infrequently (e.g., due to the implementation of the interest specifier component 302) it is preferred to support the operation of the vocabulary specifier component 304 with the data associated in association with the semantic network 312 and/or thesaurus 314.

The concept hierarchy 310 preferably contains concepts that represent interests most relevant in the respective application domain. When participant 306 tries to set-up or modify interest lists 315, e.g., likes 316 and dislikes 318, the participant 306 is enabled to select (e.g., by dragging) a concept from the hierarchy 310 and supply it (e.g., by dropping) in the relevant list 316, 318. The participant 306 preferably is also enabled to move a concept object from one list to another, and/or to delete a concept object from a list.

In one embodiment, the concept hierarchy 310 preferably organizes its concepts in levels. The top level of the hierarchy 310 contains most general, root concepts. Traversing to lower levels of the hierarchy provides progressively specific: concepts, the traversing preferably being subject to a selected total number of levels. As an example, the top level of the hierarchy may contain entertainment, recreation, and professional interests. Under entertainment reside movies, music and activities. Under recreation, there are travel and sports. Under music reside classic, rock, country, jazz, etc. Under rock reside soft, hard, heavy metal, etc.

When a concept in the above hierarchy 310 is selected, it is represented by concatenating the concepts along the path from the root concept to the selected concept. That is, the concepts at higher levels provide the context for a concept at the lower levels. As an example, if a participant selects country under music, entertainment-music-country is entered in the participant's interest list. This representation clearly distinguishes one use of a term from another. For example, the above country selection is readily distinguished from the selection of that term in the concatenation recreation-travel-country. (Integers or other designations, instead of character strings, can be used as an internal representation for the concepts selected, without departing from the principles of the invention.)

Associated with each concept preferably is a weight indicating the participant's interest level (e.g., like or dislike). The weight preferably is subject to a default value which value is maintained in the hierarchy 310 and is modifiable by the participant when the concept is added to an interest list 315. In one implementation, the participant is provided with a selected interface (e.g., a slider and/or an editable text area adjacent to the concept display) for specifying the concepts'respective weights. It is understood that, although the interface can provide for controlling the range of selectable weight values, such control can be omitted without departing from the principles of the invention, particularly if the similarity computation, as implemented, has a range between −1 and 1. If a weight is not specified for a lower level concept, the weight of a specified next-higher level concept preferably is employed.

Issues similar to the above arise in lists of people. More specifically, one name can refer to plural participants and/or one participant can be referred to by different names. Towards resolving these issues, the system preferably offers a list of selectable participant for use, e.g., to complete friends, pests and other lists.

D. Economic Features

In a system according to the invention, priority numbers can be established (i.e., base priority numbers) or modified responsive to economic features associated with the virtual environment or an application thereof. As an example, an environment/application can be implemented to comprise a cost structure that enables information providers (e.g., advertisers and underwriters) to raise the priority of their content-invested objects (hereafter sometimes referred to as an information source). In doing so, the cost structure effectively degrades one or more blocking factors set by participants (e.g., public speakers, similarity, content) that might apply to such information source. However, the cost structure preferably also enables participants, as information consumers, to increase their blocking factors. Preferably, the information provider and the participants are so enabled, but at a cost, whether through payment of money or fees, or though some other transaction.

In one embodiment, the cost structure provides n levels of pricing, the pricing levels reflected in two lists: $\{c_1, c_2, \ldots C_n\}$ and $\{e_1, e_2, \ldots e_n\}$. Each such list contains preferably n monotonically increasing, non-negative numbers. Moreover, the e-list preferably has $e_1=1$. The first list assigns a cost coefficient $c_i$ ($1<=i<=n$) to an information source based on how much the respective provider pays. Generally, the more the provider pays, the higher the value of $c_i$ assigned to the source. Similarly, the second list assigns a cost coefficient $e_j$ ($1<=j<=n$) to a participant; the more paid, the larger the value of $e_j$. In a typical implementation, it is preferred that the values of coefficients c be set sufficiently large—relative to the values of coefficients e—so as to reduce in part or entirely a participant's ability to eliminate rendering of advertisements/underwriters messages.

In operation of the above embodiment, for information consumers, some or all of the weights and blocking factors associated with previously described base and modifying priority numbers are treated as base factors to be adjusted based on a participant's coefficient $e_j$ prefatory to being used in the priority computation. As an example, when $e_j=1.2$ and the adjustment is by multiplication, the adjustment increases the base factors by 20%. As another example, when $e_1=1$ and the adjustment is by multiplication, assignment of this coefficient results in the use of unchanged base factors in the priority computation. This assignment may be applied to participants who pay the lowest fees. As an additional example, $e_1=0$ can be implemented as a special case (wherein, preferably, $e_2=1$) such that, if the adjustment is by multiplication, assignment of this coefficient zeroes the base factors. This special case can be implicated so that participants subject to this coefficient pay a fee so as to obtain any ability to establish or modify priorities and/or have any blocking power associated with weights and blocking factors.

In turn, for information providers who pay the amount associated with coefficient $c_i$, the information source is assigned an initial priority of $-c_i$. Assuming lower-valued priority numbers i.e., higher valued $c_i$) correlate to higher priority, the more a provider pays for a respective information source, the higher the initial priority of the source. Moreover, the source's initial priority, e.g., $c_k$ ($1<=k<=n$), typically is higher than the highest blocking factor any participant can have without paying, because, as stated above, $c_1>>e_1$ in the above lists.

Accordingly, in this embodiment, the participant's ability to reduce the priority of the information sources depends on the participant's choices respecting the cost structure.

In a system supporting source and media objects, it is understood that priority modification for an object based on cost structures preferably is implemented the same as, or similar to, the modifying procedures previously described. In one case, priority modification of a source object correspondingly modifies priority numbers of the associated media objects. As an example, when c's and e's are assigned to a source object, all associated media objects preferably take these assignments. In another case, however, priority modification can be effected directly as to selected media objects. As an example, a cost structure can provide for assignment of different c's to different media objects of one source object (e.g. video and audio from an advertiser). Similarly, it can provide for assignment of different e's to a participant for different media objects. In this case, while the priority numbers of only selected media objects are modified, the entry of the associated source object in a priority structure is replaced by all its media objects, including media objects that are not so modified.

E. Social Interaction

A system 8 preferably is implemented to enhance social interaction among avatars. Accordingly, if avatars A and B are engaged in an interaction session, the system 8 preferably is implemented so that B's priority $P_B$ is highest among all objects in avatar A's attention space. Similarly, the system 8 preferably is implemented so that the members of an interacting group (whose avatars are also in A's focus cone) have higher priorities than the priorities of other non-member avatars.

Enhanced social interaction may be variously accomplished using priorities. In one case, it is accomplished by assigning appropriate values to the previously-described modifying parameter $P_g$. $P_g$ is employed, together with a weight factor, to reduce the priority numbers of objects within A's focus cone (e.g., the gaze cone) are decreased in value, thereby increasing the associated priority of such objects. In another case, an additional priority modifying parameter is assigned. This parameter, designated as $M_{max}$, provides for modifying the priority number $P_B$ assigned to B when interacting with A in a pair-wise interaction context, as follows: $P_B \leftarrow P_B - M_{max}$. As an example, $M_{max}$ can be computed using the formula:

$$M_{max} = N_R + N_B + N_W + N_S.$$

where $N_R$ is the maximum priority number assignable in a radial dimension of a relevant attention space, $N_B$ is the maximum priority number assignable in an angular dimension of a relevant attention space, $N_W$ is the maximum priority number assignable to objects based on A's profile, and $N_S$, is the maximum priority number assignable to objects based on shared interests. It is understood that $M_{max}$ can be computed using other formulae, including, as an example, formulae that include more, less or different parameters (e.g., a subset of the parameters set forth above) or different operations. It is also understood that if the system assigns various $P_B$'s to B, modification thereof based on $M_{max}$ may be comprehensive or selective (e.g., modify $P_B$'s based on having correspondence to a parameter included in the selected $M_{max}$ formula).

In a system supporting source and media objects, it is understood that priority modification for an object based on social interaction preferably is implemented the same as, or similar to, the modifying procedures previously described.

F. Developer Selections

In supporting source and media objects, a system 8 preferably is implemented to enable developers to specify different priorities for different media objects associated with a single source object. As an example, it may be desirable to provide a robot that not only can simultaneously speak, play music, produce mechanical sound and generate animation, but also is configured so that speech takes precedence over each of music, mechanical sound and animation. It may also be desirable to extend the precedence hierarchy to further order the features. To do so, the developer specifies, for instance, that the robot's speech is twice as important as the mechanical sound, four times as important as the music, and three times as important as the animation. Accordingly, if the robot's entry in the R2C structure is @$P_R$), the priority of mechanical sound becomes 0.5 $P_R$ the priority of music becomes 0.25$P_R$, and the priority of animation becomes 0.33$P_R$ such that, after these modifications, the robot's entry (i.e., the source object entry) is replaced by (©$_{speech}$ $P_R$)(©$_{mech}$ 0.5$P_R$)(©$_{music}$ 0.25 $P_R$) (©$_{anim}$ 0.33$P_R$).

3. Concept Structure

In a system according to the invention, a participant preferably is enabled to use the Set-Profile and/or Set-Priority controls to select, for priority computation, a separate (or modifying) parameter associated with the participant's interests in non-avatar objects'content. To do so, the participant is enabled to specify concept words and phrases and to instruct the system to increase (decrease) priority if an object's content relates to the so-specified concept. Each word can also have a weight associated with it to indicate the participant's interest level. For example, a larger weight w, associated with words increases the priority of the object that contains the word.

Based on the interest specified by the participant, the system generates one or more concept structures. Each concept structure preferably has the form Concepts={CON $(t_1 w_1)(t_2 w_2) \ldots (t_n w_r)$} where CON indicates the type of the structure, and $(t_i, w_i)$ represents concept i and its associated weight $w_i$, 1<=i<=n. Greater magnitude for positive-valued $w_i$ preferably indicate that the participant has higher interest levels related to the concept t, and, therefore, desires to experience objects related to concept $t_i$ (e.g., through an enhanced rendering or communication). Conversely, greater magnitude for negative-valued $w_i$ indicate that the participant has no interest (or has an aversion) to the concept $t_1$ and, therefore, desires to block the objects related to concept $t_i$ (e.g., by minimizing or even negating rendering).

In one embodiment, the priority numbers associated with an object subject to a concept $t_i$ preferably have their priority number $P_x$ modified as follow: $P_x \leftarrow P_x - w_i$. In a system supporting source and media objects, it is understood that priority modification for an object based on concept structures preferably is implemented the same as, or similar to, the modifying procedures previously described.

4. Final Priority Structures

The three base priority structures are modified using various modifying parameters and, preferably, are supplemented by separate structures derived, as to objects, from information in participant profiles. The output from the priority computation(s) preferably contains one or more of the following structures, where '*' means zero or more indicated pairs:

Priority structures: {type-of-division $(A_i P_i)$*}
Concept structure: (CON $(t_i w_i)$*}
Raw structure:{RAW$(A_j R_j \cos \theta_j u_i)$*}

The structure RAW contains raw data, where $R_i$ is the distance between A and an object $A_i$, $\cos \theta_i$ is cosine of the angle between vector $AA_i$ and A's relevant focus vector (e.g., a gaze vector), and $u_i$ is the unit focus vector relating A with $A_i$ (e.g., the relevant focus vector divided by the magnitude of that vector).

In a system supporting source and media objects, if the priority numbers of one or more media objects are modified separately from the associated source object, the source object's entry in one or more relevant priority structures preferably is replaced by all its media objects. That is, after selected modifying parameters have been applied, the identifier and priority of source objects are replaced by identifiers of associated media objects and applicable priorities. In such case, the output from the priority computation(s) preferably contains one or more of the following structures, where '*' means zero or more indicated pairs.

Priority structures: {type-of-division $((A_j.m_{jl} P_{jl})$*}
Concept structure: {CON $(t_j w_i)$*}.
A Raw structure: {RAW$(A_i R_j \cos \theta_i u_i)$*}

In any case, developers can choose which output structures are to be computed based on their needs, on the resources available and on the function for application. As an example, the output structures may be applied to rendering. In that event, selected output structures can be passed as input to associated rendering engines (e.g., audio rendering engine, video rendering engine, and/or avatar animation rendering engine) and can be used to control the rendering of objects. The selected output structures can also be passed as input to operating systems and/or network systems for data processing and communication.

Examples of Using Priority Numbers in Rendering

This discussion illustrates the use of priority numbers to control the rendering of animation, video, and audio. In the discussion, the attention space is associated with vision, first person view is employed, and five avatars are resident in avatar A's vision sphere: $A_1$, $A_2$, $A_3$, $A_4$, and $A_5$. Of these avatars, only $A_3$ and $A_5$ are in A's gaze cone, while $A_1$, $A_2$, $A_3$ and $A_5$ are in A's vision cone. Moreover, A and $A_3$ are engaged in an interaction session. The base priority structure R2C={R2C $(A_1 P_{21})(A_2 P_{22}) \ldots (A_n P_{2n})$} is employed, in which dimension is divided into 3 regions and the β-dimension is divided into 8 regions. R2C's priority numbers $P_{2i}$ are assumed to have been modified using one or more modifying parameters (e.g, as described above or otherwise). It is understood that other base priority structures can be used, without departing from the principles of the invention. It is also understood that, although is only a single partner is included in the interaction session, plural partners can be so included, without departing from the principles of the invention.

With smaller priority numbers correlating to higher priority, the output structures are:

{R2 $(A_1 0)(A_2 1)(A_3 -9)(A_4 1)(A_5 2)$}

{C$(A_1 2)(A_2 2)(A_3 -10)(A_4 5)(A_5 0)$}

{R2C $(A_1 2)(A_2 3)(A_3 -10)(A_4 6)(A_5 1)$}

{CON $(t_1 w_1)(t_2 w_2) \ldots (t_n w_n)$}

{RAW $(A_1 R_1 \cos \theta_1 u_1)(A_2 R_2 \cos \theta_2 u_2) \ldots (A_5 R_5 \cos \theta_5 u_5)$}

In the above structures, the priorities and weights reflect $W_{d2} = W_c = W_g = 1$, $P_g = 1$, and $M_{max} = 10$. No modifying parameters are employed.

1. Avatar Animation

In one embodiment of operation, objects disposed outside the vision cone are not considered when assigning priorities based on the R2C structure. For such embodiment, then, the entry associated with $A_4$ is not considered. Moreover, considering only those avatars resident in the vision cone, structure R2C is sorted in the order of highest to lowest priority, i.e., by increasing priority numbers:

{R2C$(A_3 -10)(A_5 1)(A_1 2)(A_2 3)$}.

If avatars are animated in 4 levels of detail, the most detailed animation level (i.e., level 4) preferably is assigned to avatar $A_3$, as such avatar has the highest priority. Conversely, the least detailed animation level (i.e., level 1) is assigned to avatar $A_2$, while intermediate levels (e.g., level 3 and level 2) are assigned to $A_5$ and $A_1$, respectively.

This example illustrates a system 8 in which $M_{max}$ is employed to elevate to highest priority an object(s) with which A is involved in pair-wise interaction (e.g., here $A_3$).

This example also illustrates a system 8 implemented so that the members of an interacting group (whose avatars are also in A's focus cone) have higher priorities than the priorities of other, non-member avatars. To do so, $P_g$ is employed. As a result, while interacting with a partner (e.g., $A_3$), the participant's perception of signals from group members (e.g., $A_5$) is enhanced relative to the perception of signals from non-group members. Accordingly, communication tends to become less confusing and the environment tends to become more natural.

Although avatar $A_4$ preferably is removed from consideration in the above example, the avatar preferably is considered in the overall rendering determination. To do so, the system 8 of the example can employ the concept structure). To illustrate, if $t_2$ in the concept structure is the name of avatar $A_4$ and $w_2=5$, $A_4$'s priority number drops from 6 to 1, which number corresponds to a priority above that of all other avatars, other than $A_3$. Responsive to the changed priority, the developer can yet choose not to render $A_4$ as it is outside the vision cone or, if choosing to render, can choose to render at level 3 or some lower (i.e., less detailed) level. If the rendering of $A_4$ is placed at level 3, avatars $A_1$, $A_5$, and $A_2$ are rendered at some lower level of detail.

A system 8 according to the invention can be implemented enabling objects to share a priority number. In such case, the system preferably provides one or more mechanisms for mediating the assignment of rendering levels. In one case, a mediating mechanism assigns a single intermediate rendering level (e.g., 3) to both priority-sharing objects. In another case, a mediating mechanism assigns rendering levels upon reference to additional output priority structures. As an example, if the R2C structure above had assigned priority number 2 to both $A_1$ and $A_2$, a mediating mechanism could be implemented to make reference to one of structures C and R2 to determine, by lower priority number, the object to be rendered at the higher priority.

2. Video

For illustration, rendering of video is assumed to be controlled, as to resolution, by structure R2 and, as to frame rate, by structure C. Without considering avatar $A_4$ (it is outside the vision cone), the respective, sorted structures are:

{R2 $(A_3$ -9$)(A_1$ 0$)(A_2$ 1$)(A_5$ 2$)$}

{C$(A_3$ -10$)(A_5$ 0$)(A_1$ 2$)(A_2$ 2$)$}

Accordingly, avatar $A_3$ is assigned both the highest resolution and the highest frame rate. Avatar $A_1$ is assigned the next level of resolution, followed by $A_2$, then $A_5$. Avatar $A_5$ is assigned the next level of frame rate. However, assignment of the next levels of frame rate is subject to mediation in that $A_1$ and $A_2$ have the same priority number in structure C. As previously stated, various mediation mechanisms can be implemented. As an example, a mechanism can employ the concept structure in mediating such assignments.

Moreover, the concept structure can also be used to selectively render avatars having selected features. As an example, a participant's concept structure can take the following form:

{CON *(blue eyes and red hair 10)*}.

Based thereon, the rendering engine triggers the appropriate media recognition technology to isolate avatars bearing such features and, as to isolated avatars and based on the priority weighting 10, the rendering engine preferably provides enhanced rendering for such avatars and/or features.

3. Audio

In one embodiment, the system can be implemented to entirely block the rendering of audio associated with avatars disposed outside the sense cone.

In another embodiment, however, the system can be implemented not to so block such audio signals. However, the system controls the amplitude of the audio. As an example, the system can be implemented to employ the priority numbers of structure R2C so as to control objects' audio according to selected criteria, e.g., amplitude attenuation is by 3 dB for every unit difference between the associated priority number and a reference value, wherein the reference value can be variously selected, including, for example, as (a) $M_{max}$ or (b) the value of the priority number of the highest-priority avatar under consideration by A. To illustrate, if the sorted structure is: {R2C $(A_3$ -10$)(A_5$ 1$)(A_1$ 2$)(A_2$ 3$)(A_4$ 6$)$}, $A_3$'s audio signal is not attenuated, whereas the audio signals of avatars $A_5$, $A_1$, $A_2$, and $A_4$ are attenuated by, respectively, -33 dB, -36 dB, -39 dB, and -48 dB. As a result, the interacting partner $A_3$ can be heard the loudest, followed by the interacting group member As, followed by the others.

In yet another embodiment, the system can be implemented to use the R2C structure to select the audio streams to be rendered, while using the RAW structure to generate 3D sound.

In still another embodiment, the system determines the content of the audio as part of the rendering decision. As an example, assume avatar A's concept structure has the following values: {CON (high blood pressure 5)(heart attack 3)(smoking 2)}. With the concepts so selected (as compared, for example, to music or sound samples), speech is anticipated and the system is implemented to provide a transcription mechanism. The transcription mechanism transcribes the audio into text. If the text is determined to contain the phrases set forth above or some effectively related values, the audio is passed to the rendering engine with enhanced priority.

In this concept structure example, the system can also be implemented to control the amplitude of the audio, e.g., to increase the audio amplitude by 1 dB for every unit increase in the associated weight from some reference weight. In that case, if the reference weight has a value of 0, the amplitude of the audio stream containing high blood pressure is increased by 5 dB, while the amplitudes of the audio streams containing heart attack and smoking are increased, respectively, by 3 and 2 dB.

Developers preferably are enabled to select how to implement priority rendering for sound, e.g., based on their needs and on the resources available. As an example, developers can determine whether to render a selected number of words (or sentences or paragraphs) around a concept phrase or even to render an entire stream.

Applying Priority Component to Objects

The priorities, as previously described, also apply to non-avatar objects. The priorities of non-avatar objects, as with avatars, can be employed (i) to render objects, (ii) to participate in resolving conflicts among objects contending for attention and (iii) to manage system and network resources. In addition to reducing rendering-based loading of the system 8, the use of priorities can be to enhance immersion in the virtual environment.

Other Senses

The system described above, including the priority component, can be applied to senses other than vision. This application is particularly the case with those senses that have similar characteristics as vision, e.g., auditory and olfactory senses. However, it is to be understood that such senses may be characterized by different ranges and different sensitivities, e.g., sensitivities to the direction of attention focus.

Each implemented sense preferably has at least one associated attention space. Each such attention space preferably is characterized by a sense sphere, sense cone, sense vector, focus sphere, focus cone, and focus vector. As with vision, the radius of a sense sphere preferably is adjusted to reflect a perception range of the applicable sense. The direction of a focus vector represents the center of the attention. The length of the focus vector represents the distance of the attention focus, and the focus cone's internal angle of rotation determines the breadth of attention focus. To illustrate, generally, a participant cannot perceive, when in first person view, signals of sources disposed outside a first person sense cone, which cone may fill part of or the entire sense sphere. Moreover, the participant has enhanced ability to perceive the signals of sources disposed within a focus cone of the participant, as compared to the signals of sources disposed outside any such cone.

In implementation, a system according to this invention can support priorities based on a plurality of senses. The computations as to each supported sense preferably are carried out independently. As an example, the system can be implemented to assign priorities to audio information sources using a hearing space for auditory signals, while assigning priorities to animation and/or video using one or more vision spaces.

The Set-Attention control can be used, e.g., to set the radius for each sense/focus sphere, and the length and the angle for each sense/focus cone. It can also be used to choose attention spaces for use with each media type.

2D Virtual Environment

Interaction in a two-dimensional (2D) virtual environment is a special case of the interactions in virtual environments of three or more dimensions. To illustrate, in a 2D virtual environment, the priority component employs the projections of a focus cone and a focus vector in a two-dimensional (e.g., x-y) plane. The conditions and computations associated with priority computation, as previously described herein, apply in 2D cases as well, but with the components of the third dimension (e.g., z-axis) at 0.

It will be understood that various other changes in the details, materials, and arrangements of the parts and steps which have been described and illustrated in order to explain the nature of this invention may be made by those skilled in the art without departing from the principles and scope of the invention as expressed in the subjoined Claims.

What is claimed is:

1. A system enabling a virtual environment, the virtual environment supporting virtual objects, the system enabling the participant to experience one or more virtual objects through one or more human senses, the system comprising:
   a participant sensing device, the participant sensing device enabling the participant's experience of the virtual environment as to at least one human sense; and
   a priority component, the priority component supporting the participant sensing device and determining priority as to at least one of (i) which virtual object or objects are communicated for the participant to experience, (ii) the level of quality of that communication, (iii) which virtual object or objects to render, and (iv) the rendering detail of such virtual objects, which priority determination is implemented using one or more base parameters and one or more modifying parameters, the one or more modifying parameters representing one or more circumstances, characteristics, opinions, views and other matters of a personal nature relevant to the participant.

2. A system as claimed in claim 1, wherein the participant sensing device comprises a display device.

3. A system as claimed in claim 1, wherein the priority component determines priority using one or more predetermined modifying parameters, the participant being enabled to select among one or more of such modifying parameters.

4. A system as claimed in claim 1, wherein the priority component determines priority using one or more predetermined modifying parameters, the participant being enabled to revise, characterize, calibrate or otherwise alter one or more of such modifying parameters.

5. A system as claimed in claim 1, wherein the priority component determines priority using one or more modifying parameters which the participant is enabled to create.

6. A system as claimed in claim 1, wherein the modifying parameters comprise one or more of (i) the likes and dislikes of the participant directed to other avatars and virtual objects in the virtual environment, (ii) the desire of the participant to interact with an avatar of another participant having selected likes, dislikes, interests, skills and the like, (iii) the desire of the participant to interact with a non-avatar object of a selected type or having selected information, services and the like, (iv) economic models.

7. A system as claimed in claim 1, wherein virtual objects include source objects and media objects, and wherein the priority component determines priority of a source object using one or more base parameters and one or more modifying parameters, and determines priority of a media object that is or becomes associated with such source object by assigning to such media object the priority determined for the source object.

8. A system as claimed in claim 7, wherein media object are characterized by plural types and wherein the priority component assigns priority to selected media objects based on agreement of type.

9. A system as claimed in claim 1, further comprising an attention component that enables the participant to interact with one or more virtual objects, in whole and via one or more features thereof, and wherein the priority component includes as a base parameter the circumstance of any such interaction.

10. A system as claimed in claim 9, wherein the priority component enhances the priority of a virtual object, in whole and via one or more features thereof, with which the participant is interacting.

11. A system as claimed in claim 1, wherein the priority component determines priority using one or more base parameters that objectively represent a characteristic of the virtual environment.

12. A system as claimed in claim 11, wherein the virtual environment includes a virtual object being an avatar representing the participant, the avatar having an attention orientation, and wherein the priority component provides an attention space, and the one or more base parameters objectively represent at least one of (a) the relative distance between the avatar and a virtual object resident in the attention space, and (b) the angle describing the attention orientation relative to a vector associating the positions of the avatar relative to a virtual object resident in the attention space.

13. A system as claimed in claim 12, wherein the one or more base parameters comprise both the relative distance and the angle, the priority component associating relative weight coefficients with such parameters.

14. A system as claimed in claim 13, further comprising an attention component that enables the participant to interact with one or more virtual objects, in whole and via one or more features thereof, and wherein the priority component includes as a base parameter the circumstance of any such interaction and associates a weight coefficient with such base parameter.

15. A system as claimed in claim 11, further comprising an immersion point at which the participant experiences the virtual environment, the immersion point having an associated attention orientation, and wherein the priority component provides an attention space, and the one or more base parameters objectively represent at least one of (a) the relative distance between the immersion point and a virtual object resident in the attention space, and (b) the angle describing the attention orientation relative to a vector associating the positions of the immersion point relative to a virtual object resident in the attention space.

16. A system as claimed in claim 15, wherein the one or more base parameters comprise both the relative distance and the angle, the priority component associating relative weight coefficients with such parameters.

17. A system as claimed in claim 16, further comprising an attention component that enables the participant to interact with one or more virtual objects, in whole and via one or more features thereof, and wherein the priority component includes as a base parameter the circumstance of any such interaction and associates a weight coefficient with such base parameter.

* * * * *